US008746922B2

(12) United States Patent
Harbers et al.

(10) Patent No.: US 8,746,922 B2
(45) Date of Patent: Jun. 10, 2014

(54) LED BASED ILLUMINATION MODULE COLOR MATCHED TO AN ARBITRARY LIGHT SOURCE

(75) Inventors: Gerard Harbers, Sunnyvale, CA (US); Raghuram L. V. Petluri, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 13/470,031

(22) Filed: May 11, 2012

(65) Prior Publication Data

US 2012/0224177 A1    Sep. 6, 2012

Related U.S. Application Data

(62) Division of application No. 12/870,738, filed on Aug. 27, 2010.

(51) Int. Cl.
*F21V 9/00*    (2006.01)
(52) U.S. Cl.
USPC ............. 362/231; 362/84; 362/228; 362/284; 362/294; 313/502; 313/503; 313/504; 356/402
(58) Field of Classification Search
USPC ........................... 362/84, 228, 284, 294, 231; 313/502–504; 356/402
See application file for complete search history.

(56) References Cited

U.S. PATENT DOCUMENTS

| | | |
|---|---|---|
| 3,593,055 A | 7/1971 | Geusic et al. |
| 5,959,316 A | 9/1999 | Lowery |
| 5,962,971 A | 10/1999 | Chen |
| 5,966,393 A | 10/1999 | Hide et al. |
| 5,982,092 A | 11/1999 | Chen |
| 5,998,925 A | 12/1999 | Shimizu et al. |

(Continued)

FOREIGN PATENT DOCUMENTS

| | | |
|---|---|---|
| EP | 0 890 996 B1 | 1/1999 |
| EP | 1 548 851 A2 | 6/2005 |

(Continued)

OTHER PUBLICATIONS

International Preliminary Report on Patentability mailed on Mar. 14, 2013 for PCT Application No. PCT/US2011/049017 filed on Aug. 24, 2011, 7 pages.

(Continued)

*Primary Examiner* — Thomas Sember
*Assistant Examiner* — Tsion Tumebo
(74) *Attorney, Agent, or Firm* — Silicon Valley Patent Group LLP

(57) ABSTRACT

LED based illumination modules are realized that are visually color matched to light sources not based on LEDs based on visually matched color spaces. A visually matched color space is employed to both instrumentally and visually match an LED based light source with a light source not based on LEDs. In one aspect, an LED based illumination module is realized to achieve a target color point in a visually matched color space within a predetermined tolerance. In another aspect, an LED based illumination module is realized to visually match a light source not based on LEDs. A target color point in the CIE 1931 XYZ color space is derived based at least in part on the spectrum of the visually matched LED based illumination module. LED based illumination modules visually matched to light sources not based on LEDs are realized based on the derived target color point.

17 Claims, 15 Drawing Sheets

(56) References Cited

U.S. PATENT DOCUMENTS

| | | | |
|---|---|---|---|
| 6,066,861 A | 5/2000 | Hohn et al. | |
| 6,068,383 A | 5/2000 | Robertson et al. | |
| 6,220,725 B1 | 4/2001 | Arnold | |
| 6,234,648 B1 | 5/2001 | Borner et al. | |
| 6,340,824 B1 | 1/2002 | Komoto et al. | |
| 6,351,069 B1 | 2/2002 | Lowery et al. | |
| 6,357,889 B1 | 3/2002 | Duggal et al. | |
| 6,469,322 B1 | 10/2002 | Srivastava et al. | |
| 6,504,301 B1 | 1/2003 | Lowery | |
| 6,576,930 B2 | 6/2003 | Reeh et al. | |
| 6,577,073 B2 | 6/2003 | Shimizu et al. | |
| 6,586,882 B1 | 7/2003 | Harbers | |
| 6,600,175 B1 | 7/2003 | Baretz et al. | |
| 6,621,211 B1* | 9/2003 | Srivastava et al. | 313/503 |
| 6,649,946 B2 | 11/2003 | Bogner et al. | |
| 6,680,569 B2 | 1/2004 | Mueller-Mach et al. | |
| 6,724,142 B2 | 4/2004 | Ellens et al. | |
| 6,765,237 B1 | 7/2004 | Doxsee et al. | |
| 6,791,259 B1 | 9/2004 | Stokes et al. | |
| 6,809,342 B2 | 10/2004 | Harada | |
| 6,812,500 B2 | 11/2004 | Reeh et al. | |
| 6,850,002 B2 | 2/2005 | Danielson et al. | |
| 7,005,679 B2 | 2/2006 | Tarsa et al. | |
| 7,083,302 B2 | 8/2006 | Chen et al. | |
| 7,126,162 B2 | 10/2006 | Reeh et al. | |
| 7,250,715 B2 | 7/2007 | Mueller et al. | |
| 7,331,697 B1* | 2/2008 | Hulse | 362/551 |
| 7,344,952 B2 | 3/2008 | Chandra | |
| 7,404,652 B2 | 7/2008 | Ng et al. | |
| 7,479,662 B2 | 1/2009 | Soules et al. | |
| 7,494,246 B2 | 2/2009 | Harbers | |
| 7,534,002 B2 | 5/2009 | Yamaguchi et al. | |
| 7,564,180 B2 | 7/2009 | Brandes | |
| 7,614,759 B2 | 11/2009 | Negley | |
| 7,629,621 B2 | 12/2009 | Reeh et al. | |
| 7,682,850 B2 | 3/2010 | Harbers et al. | |
| 7,768,192 B2 | 8/2010 | Van De Ven et al. | |
| 7,942,556 B2 | 5/2011 | Harbers et al. | |
| 7,984,999 B2 | 7/2011 | Harbers et al. | |
| 8,035,287 B2* | 10/2011 | Schmidt et al. | 313/487 |
| 8,220,971 B2 | 7/2012 | Harbers et al. | |
| 8,382,335 B2 | 2/2013 | Harbers et al. | |
| 2002/0043926 A1 | 4/2002 | Takahashi et al. | |
| 2005/0057145 A1 | 3/2005 | Shieh et al. | |
| 2006/0076882 A1 | 4/2006 | Chan et al. | |
| 2006/0087487 A1 | 4/2006 | Ota | |
| 2006/0125923 A1 | 6/2006 | Israel et al. | |
| 2006/0152140 A1 | 7/2006 | Brandes | |
| 2007/0081336 A1 | 4/2007 | Bierhuizen et al. | |
| 2007/0115665 A1* | 5/2007 | Mueller et al. | 362/276 |
| 2007/0147032 A1 | 6/2007 | Furukawa et al. | |
| 2007/0215890 A1 | 9/2007 | Harbers et al. | |
| 2007/0223219 A1 | 9/2007 | Medendorp et al. | |
| 2007/0263393 A1 | 11/2007 | Van De Ven | |
| 2008/0128735 A1 | 6/2008 | Yoo et al. | |
| 2008/0142816 A1 | 6/2008 | Bierhuizen et al. | |
| 2008/0169480 A1 | 7/2008 | Weng et al. | |
| 2008/0211751 A1 | 9/2008 | Kim | |
| 2008/0310152 A1 | 12/2008 | Verbrugh et al. | |
| 2008/0310158 A1 | 12/2008 | Harbers et al. | |
| 2009/0008655 A1 | 1/2009 | Peeters et al. | |
| 2009/0086475 A1* | 4/2009 | Caruso et al. | 362/231 |
| 2009/0103293 A1 | 4/2009 | Harbers et al. | |
| 2010/0067214 A1* | 3/2010 | Hoelen et al. | 362/84 |
| 2010/0127282 A1 | 5/2010 | Harbers et al. | |
| 2010/0327306 A1 | 12/2010 | Van Der Burgt et al. | |
| 2011/0026257 A1 | 2/2011 | Holten et al. | |
| 2013/0130412 A1 | 5/2013 | Harbers et al. | |

FOREIGN PATENT DOCUMENTS

| | | |
|---|---|---|
| EP | 1 780 592 A1 | 5/2007 |
| EP | 2 117 055 A2 | 11/2009 |
| EP | 1 081 771 B1 | 6/2011 |
| JP | 2005-093896 A | 4/2005 |
| JP | 2008-159707 A | 7/2008 |
| TW | I283078 B | 6/2007 |
| TW | I296448 B | 5/2008 |
| WO | WO 2007/002234 A1 | 1/2007 |
| WO | WO 2007/130536 A2 | 11/2007 |
| WO | WO 2008/047290 A1 | 4/2008 |
| WO | WO 2008/126038 A1 | 10/2008 |
| WO | WO 2008/142638 A1 | 11/2008 |
| WO | WO 2008/149250 A1 | 12/2008 |
| WO | WO 2008/157080 A2 | 12/2008 |
| WO | WO 2008/157080 A3 | 12/2008 |
| WO | WO 2009/052099 A1 | 4/2009 |
| WO | WO 2009/052099 A4 | 4/2009 |
| WO | WO 2009/093163 A2 | 7/2009 |

OTHER PUBLICATIONS

International Search Report mailed on Dec. 15, 2011 for PCT Application No. PCT/US2011/049017 filed on Aug. 24, 2011 by Xicato, Inc., 11 pages.

International Search Report mailed on Feb. 23, 2010 for PCT Application No. PCT/US2009/064492 filed on Nov. 14, 2009, 16 pages.

International Preliminary Report on Patentability mailed on May 24, 2011 for PCT Application No. PCT/US2009/064492 filed on Nov. 14, 2009, 9 pages.

English Abstract of JP2008159707 (A) published on Jul. 10, 2008 visited at <http://worldwide.espacenet.com> on Sep. 18, 2012, 2 pages.

English Abstract of JP2005093896 (A) published on Apr. 7, 2005 visited at <http://worldwide.espacenet.com> on Sep. 18, 2012, 2 pages.

English Abstract of TWI296448 (B) published on May 1, 2008 visited at <http://worldwide.espacenet.com> on Sep. 18, 2012, 2 pages.

English Abstract of TWI283078 (B) published on Jun. 21, 2007 visited at <http://worldwide.espacenet.com> on Sep. 18, 2012, 2 pages.

Harbers et al. (Jun. 2007). "Performance of High Power Light Emitting Diodes in Display Illumination Applications," *Journal of Display Technology* vol. 3, No. 2, pp. 98-109.

Hoelen et al. (Sep. 12, 2008). "Remote Phosphor LED Modules for General Illumination Towards 200 lm/W General Lighting LED Light Sources," *SPIE* vol. 7058, pp. 1-10.

\* cited by examiner

LED BASED ILLUMINATION MODULE COLOR MATCHED TO AN ARBITRARY LIGHT SOURCE

CROSS REFERENCE TO RELATED APPLICATIONS

This application is a divisional of U.S. patent application Ser. No. 12/870,738, filed Aug. 27, 2010, and entitled "LED Based Illumination Module Color Matched To An Arbitrary Light Source," which is incorporated herein by reference in its entirety.

TECHNICAL FIELD

The described embodiments relate to illumination modules that include Light Emitting Diodes (LEDs).

BACKGROUND INFORMATION

The CIE 1931 XYZ color space is widely used to characterize the color of light emitted from various light sources. Light sources may be compared based upon their respective color points derived from the CIE 1931 color space. Improvements to illumination devices that use LEDs as the light source are desired to achieve a visual color match to light sources that do not use LEDs.

SUMMARY

Color targeting based on visually matched color spaces is presented to reliably manufacture LED based illumination modules that are visually color matched to light sources not based on LEDs. A visually matched color space is employed to both instrumentally and visually match an LED based light source with a light source not based on LEDs. In one aspect, an LED based illumination module is constructed to achieve a target color point in a visually matched color space within a predetermined tolerance. In another aspect, an LED based illumination module is constructed to visually match a light source not based on LEDs and a target color point in the CIE 1931 XYZ color space is derived based on the spectrum of the visually matched LED based illumination module. Further details and embodiments and techniques are described in the detailed description below. This summary does not claim to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
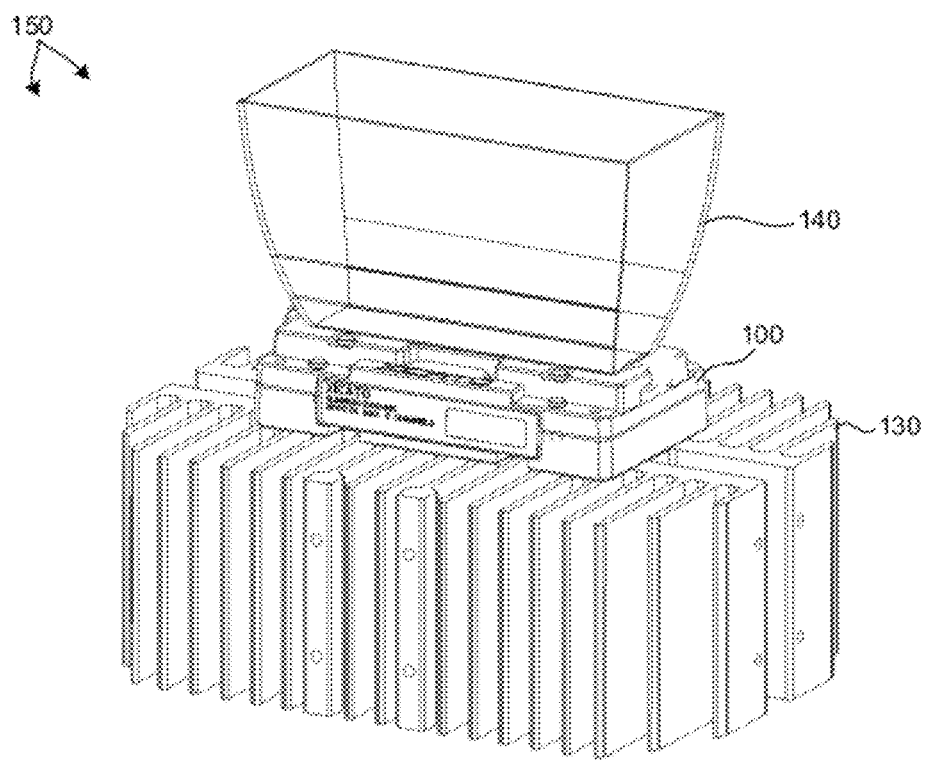
FIG. 1 is illustrative of a luminaire that includes an LED based illumination module 100 with a rectangular form factor.
Figure 2:
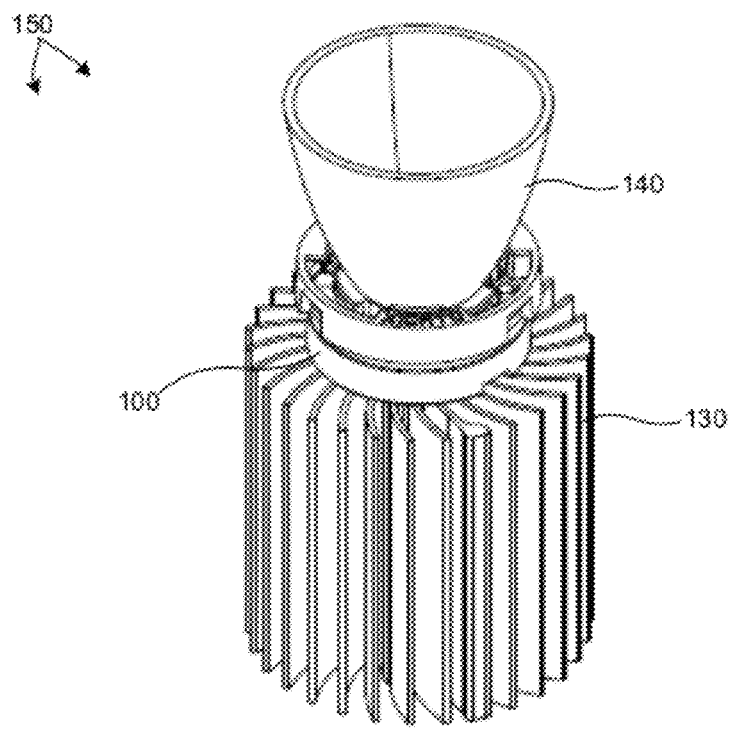
FIG. 2 is illustrative of a luminaire that includes an LED based illumination module 100 with a circular form factor.

FIGS. 1-2 illustrate two exemplary luminaires. The luminaire illustrated in FIG. 1 includes an illumination module 100 with a rectangular form factor. The luminaire illustrated in FIG. 2 includes an illumination module 100 with a circular form factor. These examples are for illustrative purposes. Examples of illumination modules of general polygonal and elliptical shapes may also be contemplated. Luminaire 150 includes illumination module 100, reflector 140, and light fixture 130. As depicted, light fixture 130 is a heat sink. However, light fixture 130 may include other structural and decorative elements (not shown). Reflector 140 is mounted to illumination module 100 to collimate or deflect light emitted from illumination module 100. The reflector 140 may be made from a thermally conductive material, such as a material that includes aluminum or copper and may be thermally coupled to illumination module 100. Heat flows by conduction through illumination module 100 and the thermally conductive reflector 140. Heat also flows via thermal convection over the reflector 140. Reflector 140 may be a compound parabolic concentrator, where the concentrator is constructed of or coated with a highly reflecting material. Optical elements, such as a diffuser or reflector 140 may be removably coupled to illumination module 100, e.g., by means of threads, a clamp, a twist-lock mechanism, or other appropriate arrangement. A luminaire 150 that includes illumination module 100 could also be a retrofit lamp.

Illumination module 100 is mounted to light fixture 130. As depicted in FIGS. 1 and 2, illumination module 100 is mounted to heat sink 130. Heat sink 130 may be made from a thermally conductive material, such as a material that includes aluminum or copper and may be thermally coupled to illumination module 100. Heat flows by conduction through illumination module 100 and the thermally conductive heat sink 130. Heat also flows via thermal convection over heat sink 130. Illumination module 100 may be attached to heat sink 130 by way of screw threads to clamp the illumination module 100 to the heat sink 130. To facilitate easy removal and replacement of illumination module 100, illumination module 100 may be removably coupled to illumination module 100, e.g., by means of a clamp mechanism, a twist-lock mechanism, or other appropriate arrangement. Illumination module 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module 100.

Figure 3A:
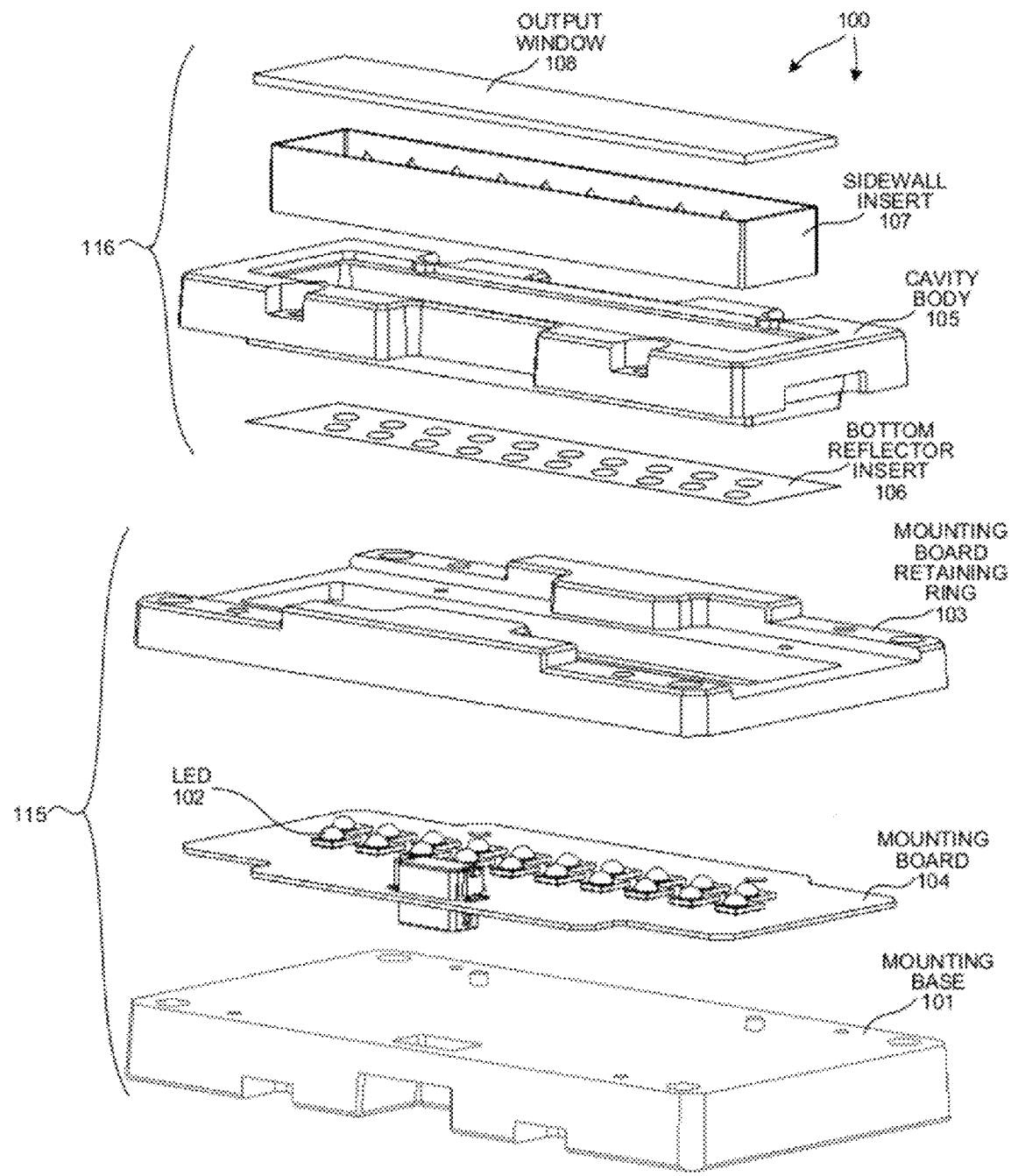
FIG. 3A illustrates an exploded view of components of the LED based illumination module 100 depicted in FIG. 1.

FIG. 3A illustrates an exploded view of components of LED based illumination module 100 as depicted in FIG. 1. It should be understood that as defined herein an LED based illumination module is not an LED, but is an LED light source or fixture or component part of an LED light source or fixture. LED based illumination module 100 includes one or more LED die or packaged LEDs and a mounting board to which LED die or packaged LEDs are attached. LED based illumination module 100 includes one or more solid state light emitting elements, such as light emitting diodes (LEDs) 102 mounted on mounting board 104. Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and output window 108, and optionally includes either or both bottom reflector insert 106 and sidewall insert 107. Output window 108 is fixed to the top of cavity body 105. Cavity body 105 includes interior sidewalls such that the interior sidewalls direct light from the LEDs 102 to the output window when cavity body 105 is mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination module 100, other shapes may be contemplated (e.g. clover shaped or polygonal). In addition, the interior sidewalls of cavity body 105 may taper outward from mounting board 104 to output window 108, rather than perpendicular to output window 108 as depicted.

Figure 3B:
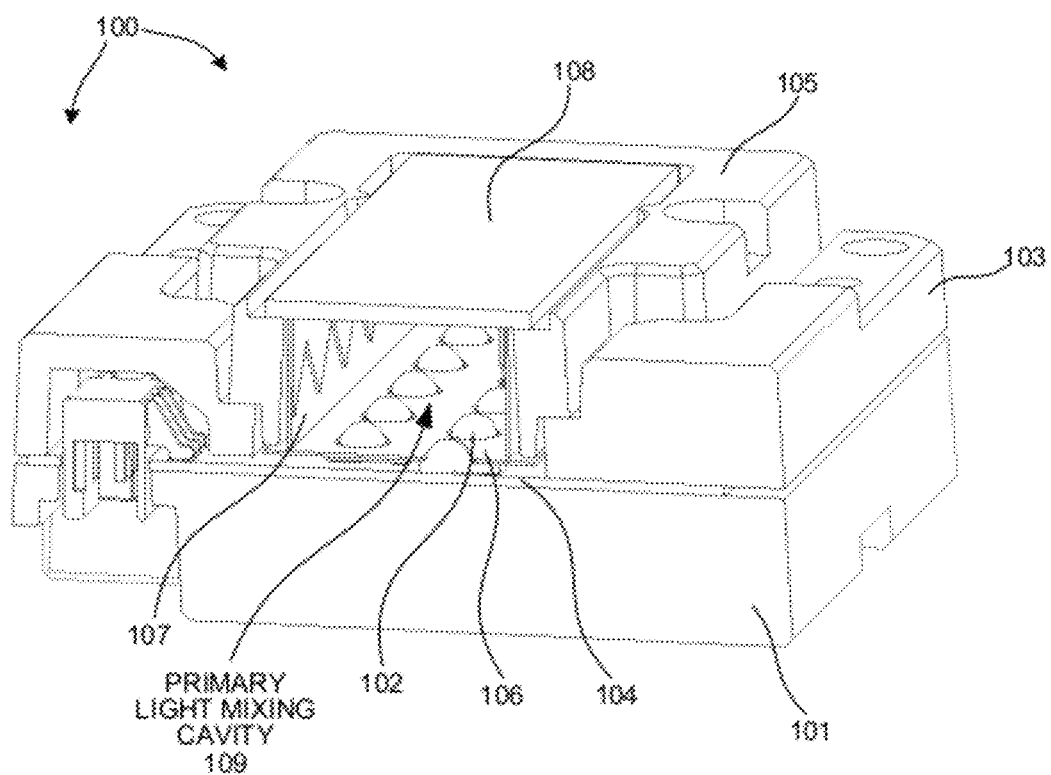
FIG. 3B illustrates a perspective, cross-sectional view of the LED based illumination module 100 depicted in FIG. 1.

FIG. 3B illustrates a perspective, cross-sectional view of LED based illumination module 100 as depicted in FIG. 1. In this embodiment, the sidewall insert 107, output window 108, and bottom reflector insert 106 disposed on mounting board 104 define a light mixing cavity 109 in the LED based illumination module 100 in which a portion of light from the LEDs 102 is reflected until it exits through output window 108. Reflecting the light within the cavity 109 prior to exiting the output window 108 has the effect of mixing the light and providing a more uniform distribution of the light that is emitted from the LED based illumination module 100. Portions of the sidewalls of cavity body 105, or optionally, sidewall insert 107 may be coated with a wavelength converting material. Furthermore, portions of output window 108 may be coated with the same or a different wavelength converting material. In addition, portions of bottom reflector insert 106 may be coated with the same or a different wavelength converting material. The photo converting properties of these materials in combination with the mixing of light within cavity 109 results in a color converted light output by output window 108. By tuning the chemical properties of the wavelength converting materials and the geometric properties of the coatings on the interior surfaces of cavity 109 (e.g. layer thickness, phosphor particle size, phosphor mixture, and particle density), specific color properties of light output by output window 108 may be specified, e.g. color point, color temperature, and color rendering index (CRI).

For purposes of this patent document, a wavelength converting material is any single chemical compound or mixture of different chemical compounds that performs a color conversion function, e.g. partially absorbs light of one peak wavelength and emits light at another peak wavelength.

Cavity 109 may be filled with a non-solid material, such as air or an inert gas, so that the LEDs 102 emit light into the non-solid material. By way of example, the cavity may be hermetically sealed and Argon gas used to fill the cavity. Alternatively, Nitrogen may be used. In other embodiments, cavity 109 may be filled with a solid encapsulant material. By way of example, silicone may be used to fill the cavity.

The LEDs 102 can emit different or the same colors, either by direct emission or by phosphor conversion, e.g., where phosphor layers are applied to the LEDs as part of the LED package. Thus, the illumination module 100 may use any combination of colored LEDs 102, such as red, green, blue, amber, or cyan, or the LEDs 102 may all produce the same color light or may all produce white light. For example, the LEDs 102 may all emit either blue or UV light. When used in combination with phosphors (or other wavelength conversion means), which may be, e.g., in or on the output window 108, applied to the sidewalls of cavity body 105, or applied to other components placed inside the cavity (not shown), such that the output light of the illumination module 100 has the color as desired.

The mounting board 104 provides electrical connections to the attached LEDs 102 to a power supply (not shown). In one embodiment, the LEDs 102 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 102 may include a lens over the LED chips. Alternatively, LEDs without a lens may be used. LEDs without lenses may include protective layers, which may include phosphors. The phosphors can be applied as a dispersion in a binder, or applied as a separate layer. Each LED 102 includes at least one LED chip or die, which may be mounted on a submount. The LED chip typically has a size about 1 mm by 1 mm by 0.5 mm, but these dimensions may vary. In some embodiments, the LEDs 102 may include multiple chips. The multiple chips can emit light similar or different colors, e.g., red, green, and blue. In addition, different phosphor layers may be applied on different chips on the same submount. The submount may be ceramic or other appropriate material. The submount typically includes electrical contact pads on a bottom surface that are coupled to contacts on the mounting board 104. Alternatively, electrical bond wires may be used to electrically connect the chips to a mounting board. Along with electrical contact pads, the LEDs 102 may include thermal contact areas on the bottom surface of the submount through which heat generated by the LED chips can be extracted. The thermal contact areas are coupled to heat spreading layers on the mounting board 104. Heat spreading layers may be disposed on any of the top, bottom, or intermediate layers of mounting board 104. Heat spreading layers may be connected by vias that connect any of the top, bottom, and intermediate heat spreading layers.

In some embodiments, the mounting board 104 conducts heat generated by the LEDs 102 to the sides of the board 104 and the bottom of the board 104. In one example, the bottom of mounting board 104 may be thermally coupled to a heat sink 130 (shown in FIGS. 1 and 2) via mounting base 101. In other examples, mounting board 104 may be directly coupled to a heat sink, or a lighting fixture and/or other mechanisms to dissipate the heat, such as a fan. In some embodiments, the mounting board 104 conducts heat to a heat sink thermally coupled to the top of the board 104. For example, mounting board retaining ring 103 and cavity body 105 may conduct heat away from the top surface of mounting board 104. Mounting board 104 may be an FR4 board, e.g., that is 0.5 mm thick, with relatively thick copper layers, e.g., 30 µm to 100 µm, on the top and bottom surfaces that serve as thermal contact areas. In other examples, the board 104 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 104 includes electrical pads to which the electrical pads on the LEDs 102 are connected. The electrical pads are electrically connected by a metal, e.g., copper, trace to a contact, to which a wire, bridge or other external electrical source is connected. In some embodiments, the electrical pads may be vias through the board 104 and the electrical connection is made on the opposite side, i.e., the bottom, of the board. Mounting board 104, as illustrated, is rectangular in dimension. LEDs 102 mounted to mounting board 104 may be arranged in different configurations on rectangular mounting board 104. In one example LEDs 102 are aligned in rows extending in the length dimension and in columns extending in the width dimension of mounting board 104. In another example, LEDs 102 are arranged in a hexagonally closely packed structure. In such an arrangement each LED is equidistant from each of its immediate neighbors. Such an arrangement is desirable to increase the uniformity and efficiency of light emitted from the light source sub-assembly 115.

Figure 4:
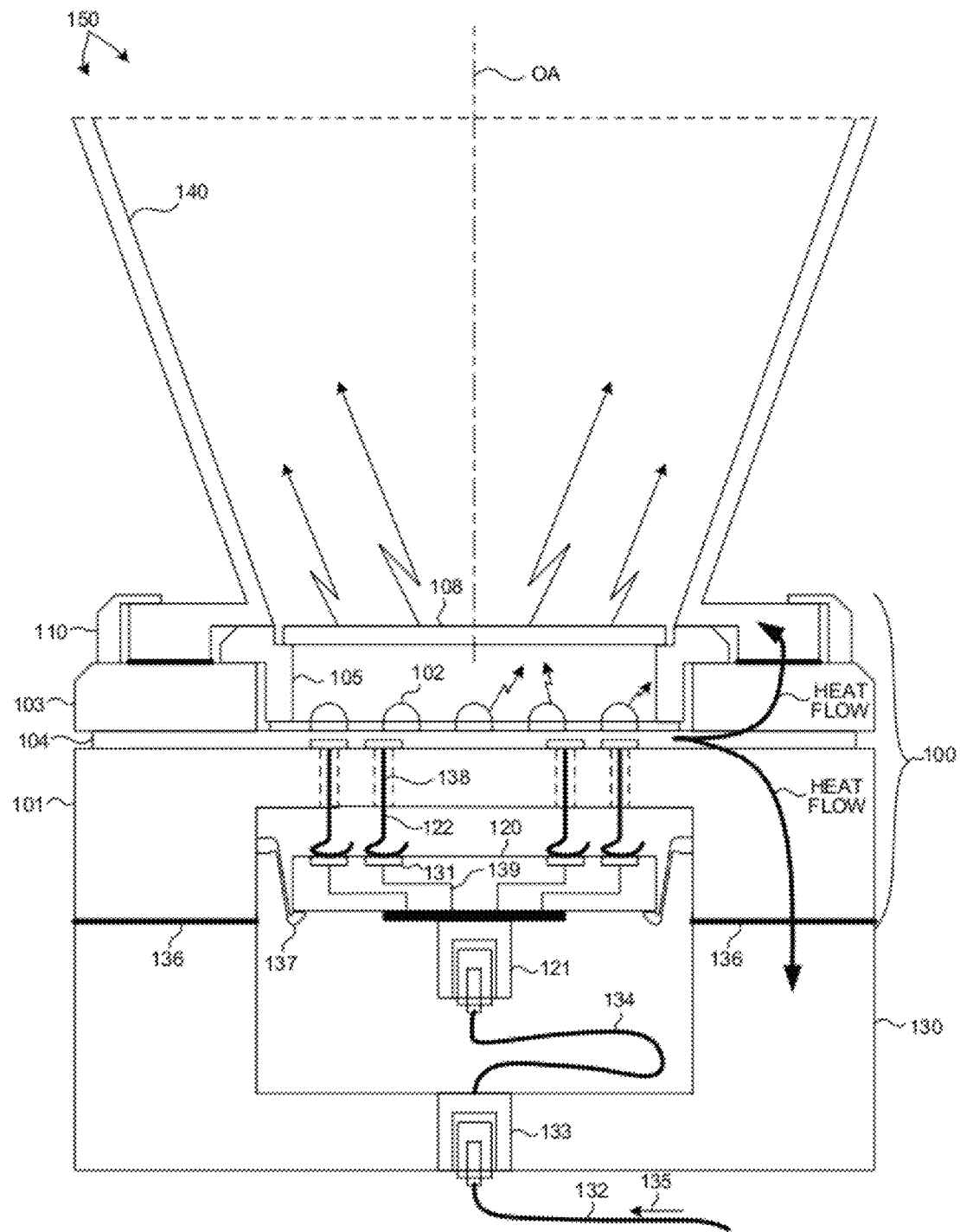
FIG. 4 illustrates a cut-away view of the luminaire 150 depicted in FIG. 2.

FIG. 4 illustrates a cut-away view of luminaire 150 as depicted in FIG. 2. Reflector 140 is removably coupled to illumination module 100. Reflector 140 is coupled to illumination module 100 by a twist-lock mechanism. Reflector 140 is aligned with illumination module 100 by bringing reflector 140 into contact with illumination module 100 through openings in reflector retaining ring 110. Reflector 140 is coupled to illumination module 100 by rotating reflector 140 about optical axis (OA) to an engaged position. In the engaged position, the reflector 140 is captured between mounting board retaining ring 103 and reflector retaining ring 110. In the engaged position, an interface pressure may be generated between mating thermal interface surface 123 of reflector 140 and mounting board retaining ring 103. In this manner, heat generated by LEDs 102 may be conducted via mounting board 104, through mounting board retaining ring 103, through interface 123, and into reflector 140. In addition, a plurality of electrical connections may be formed between reflector 140 and retaining ring 103.

Illumination module 100 includes an electrical interface module (EIM) 120. As illustrated, EIM 120 may be removably attached to illumination module 100 by retaining clips 137. In other embodiments, EIM 120 may be removably attached to illumination module 100 by an electrical connector coupling EIM 120 to mounting board 104. EIM 120 may also be coupled to illumination module 100 by other fastening means, e.g. screw fasteners, rivets, or snap-fit connectors. As depicted EIM 120 is positioned within a cavity of illumination module 100. In this manner, EIM 120 is contained within illumination module 100 and is accessible from the bottom side of illumination module 100. In other embodiments, EIM 120 may be at least partially positioned within light fixture 130. The EIM 120 communicates electrical signals from light fixture 130 to illumination module 100. Electrical conductors 132 are coupled to light fixture 130 at electrical connector 133. By way of example, electrical connector 133 may be a registered jack (RJ) connector commonly used in network communications applications. In other examples, electrical conductors 132 may be coupled to light fixture 130 by screws or clamps. In other examples, electrical conductors 132 may be coupled to light fixture 130 by a removable slip-fit electrical connector. Connector 133 is coupled to conductors 134. Conductors 134 are removably coupled to electrical connector 121 that is mounted to EIM 120. Similarly, electrical connector 121 may be a RJ connector or any suitable removable electrical connector. Connector 121 is fixedly coupled to EIM 120. Electrical signals 135 are communicated over conductors 132 through electrical connector 133, over conductors 134, through electrical connector 121 to EIM 120. Electrical signals 135 may include power signals and data signals. EIM 120 routes electrical signals 135 from electrical connector 121 to appropriate electrical contact pads on EIM 120. For example, conductor 139 within EIM 120 may couple connector 121 to electrical contact pad 131 on the top surface of EIM 120. As illustrated, spring pin 122 removably couples electrical contact pad 131 to mounting board 104. Spring pins couple contact pads disposed on the top surface of EIM 120 to contact pads of mounting board 104. In this manner, electrical signals are communicated from EIM 120 to mounting board 104. Mounting board 104 includes conductors to appropriately couple LEDs 102 to the contact pads of mounting board 104. In this manner, electrical signals are communicated from mounting board 104 to appropriate LEDs 102 to generate light. EIM 120 may be constructed from a printed circuit board (PCB), a metal core PCB, a ceramic substrate, or a semiconductor substrate. Other types of boards may be used, such as those made of alumina (aluminum oxide in ceramic form), or aluminum nitride (also in ceramic form). EIM 120 may be a constructed as a plastic part including a plurality of insert molded metal conductors.

Mounting base 101 is replaceably coupled to light fixture 130. In the illustrated example, light fixture 130 acts as a heat sink. Mounting base 101 and light fixture 130 are coupled together at a thermal interface 136. At the thermal interface, a portion of mounting base 101 and a portion of light fixture 130 are brought into contact as illumination module 100 is coupled to light fixture 130. In this manner, heat generated by LEDs 102 may be conducted via mounting board 104, through mounting base 101, through interface 136, and into light fixture 130.

To remove and replace illumination module 100, illumination module 100 is decoupled from light fixture 130 and electrical connector 121 is disconnected. In one example, conductors 134 includes sufficient length to allow sufficient separation between illumination module 100 and light fixture 130 to allow an operator to reach between fixture 130 and illumination module 100 to disconnect connector 121. In another example, connector 121 may be arranged such that a displacement between illumination module 100 from light fixture 130 operates to disconnect connector 121. In another example, conductors 134 are wound around a spring-loaded reel. In this manner, conductors 134 may be extended by unwinding from the reel to allow for connection or disconnection of connector 121, and then conductors 134 may be retracted by winding conductors 134 onto the reel by action of the spring-loaded reel.

With the two or more of wavelength converting components of the light mixing cavity 109 each with different wavelength converting properties, the LED based illumination module 100 may produce a predetermined or target color point with a high degree of accuracy.

Figure 5:
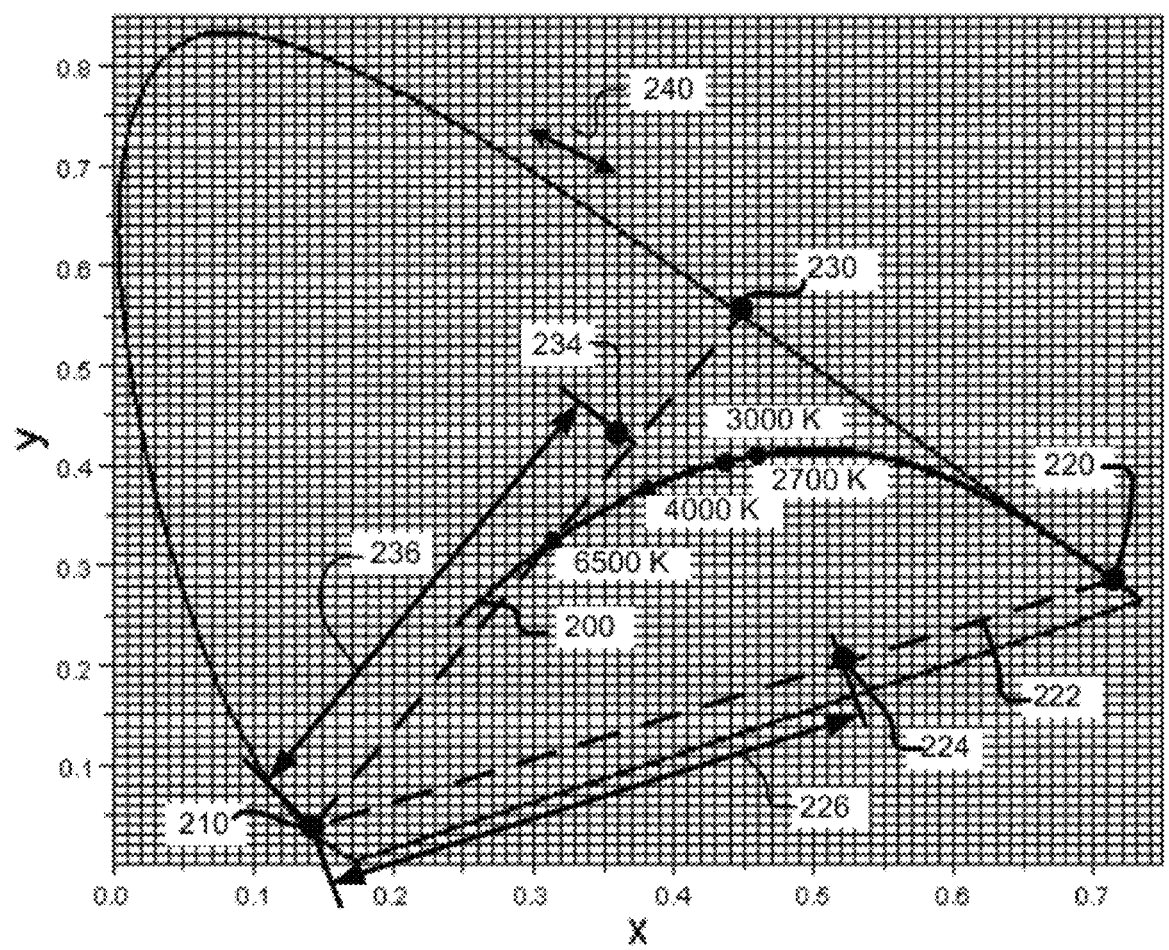
FIG. 5 is illustrative of a (xy) chromaticity diagram based on the CIE 1931 XYZ color space.

FIG. 5 is illustrative of a (xy) chromaticity diagram based on the CIE 1931 XYZ color space. The CIE 1931 color space is based on three color matching functions. The three tristimulus values express the CIE 1931 XYZ color space as a three dimensional color space. Each color matching function relates a given spectrum, $S(\lambda)$, to each of the three tristimulus values, X, Y, and Z, as described in equation (1).

$$X_{1931} = \int CMF_X S(\lambda) d\lambda,$$

$$Y_{1931} = \cdot CMF_Y S(\lambda) d\lambda,$$

$$Z_{1931} = \int CMF_Z S(\lambda) d\lambda, \quad (1)$$

The xy chromaticity diagram of FIG. 5 is a projection of the three dimensional CIE 1931 XYZ color space onto a two dimensional space (xy) such that brightness is ignored. Each color coordinate (x,y) may be expressed as a function of the three tristimulus values as described in equation (2).

$$x = \frac{X}{X+Y+Z} \quad (2)$$
$$y = \frac{Y}{X+Y+Z}$$

There are other color spaces that are simple projective transformations of the CIE 1931 XYZ color space. For example, both the CIE 1960 uniform color scale (CIE 1960 UCS) and the CIE 1976 uniform color scale (CIE 1976 UCS) are simple transformations of the CIE 1931 XYZ color space. The CIE 1960 UCS expresses two dimensional chromaticity (uv) as a function of the three tristimulus values as described in equation (3).

$$u = \frac{4X}{X+15Y+3Z} \quad (3)$$
$$v = \frac{6Y}{X+15Y+3Z}$$

The CIE 1976 UCS expresses two dimensional chromaticity (u'v') as a function of the three tristimulus values as described in equation (4).

$$u' = \frac{4X}{X+15Y+3Z} \quad (4)$$
$$v' = \frac{9Y}{X+15Y+3Z}$$

Figure 6:
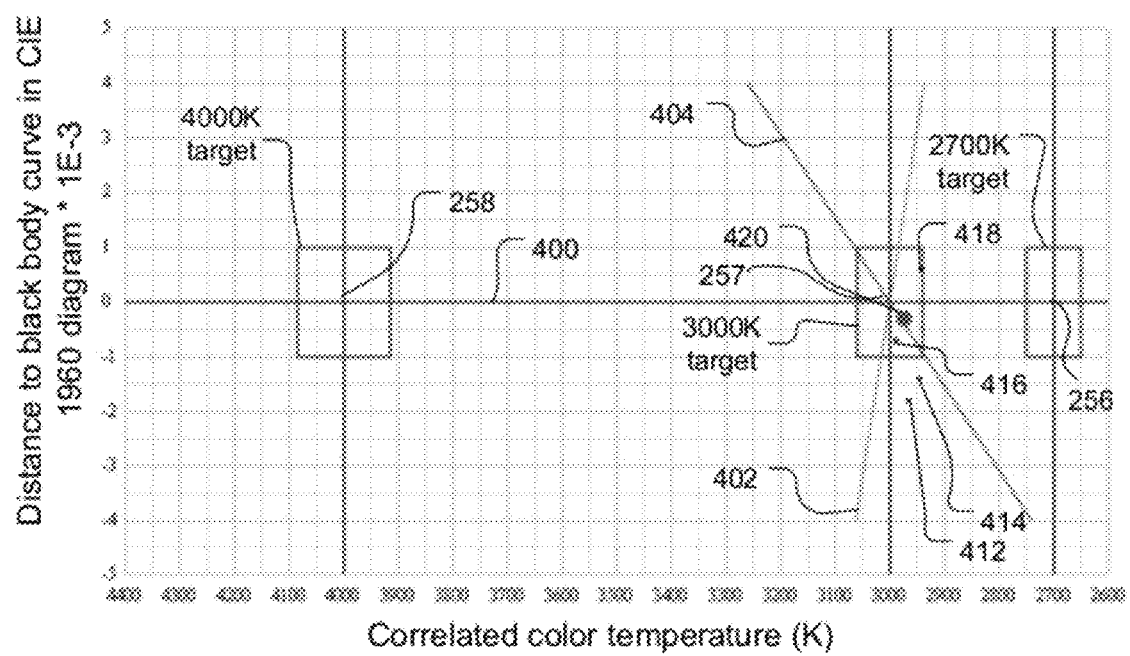
FIG. 6 is a diagram illustrating color points of LED modules and predetermined target color points on the black-body curve.

The CIE 1960 UCS color space has generally been superseded by the CIE 1976 UCS color space as an expression of uniform chromaticity. However, the CIE 1960 UCS color space is still useful as an expression of chromaticity because the isothermal lines of correlated color temperature (CCT) are aligned perpendicular to the Planckian locus in CIE 1960 UCS. In the context of the CIE 1960 UCS, the degree of departure is the distance between the color point of the light produced by the light source and the Planckian locus along a line of constant CCT. The degree of departure is referred to in units of Δuv in CIE 1960 UCS. Thus, the color point of a white light source may be described as a CCT value and a Δuv value, i.e., the degree of departure from the black-body curve as measured in the CIE 1960 color space. It follows that the specification for color of light output by LED based illumination module 100 can be expressed as a CCT value within a predetermined tolerance and a Δuv value within a predetermined tolerance. FIG. 6 illustrates a plot of the black-body curve 400, sometimes referred to as a Planckian locus, parallel to the horizontal axis and units of Δuv along the vertical axis in the context of the CIE 1960 chromaticity diagram. Target color points 256-258 are illustrated as exemplary target color points. The degree of departure from the target color point is referred to in units of Δuv. When the color point of a light source varies significantly from a predetermined target color point, the color of the light will be perceptively different from the desired color. Moreover when light sources are near each other, e.g., in accent lighting or a display, even slight color differences are noticeable and considered undesirable.

Producing light sources that generate light near a target color point is desirable. For example, when used for purposes of general illumination, it is desirable that the LED based illumination module 100 produce white light with a particular correlated color temperature (CCT). CCT relates to the temperature of a black-body radiator and temperatures between 2700K and 6000K are typically useful for general illumination purposes. Higher color temperatures are considered "cool" as they are bluish in color, while lower temperatures are considered "warm" as they contain more yellow-red colors. By way of example, CCTs of 2700K, 3000K, 3500K, 4000K, 4200K, 5000K, 6500K are often desirable. In another example, light emitted from an LED based illumination module targeting any of CIE illuminant series A, B, C, D, E, and F are desirable.

As illustrated in FIG. 5, the chromaticity of a black-body radiator in CIE 1931 color space is represented by curve 200. This curve is sometimes referred to as the Planckian locus. Ideally, light sources produce light that lies on the black-body curve 200 at a target color point. In practice, however, producing light at a target color point on the black-body curve 200 is difficult, particularly with an LED light source because of the lack of precise control over the light output of an LED light source manufactured using current processes. Typically, there will be some distance between the color point of the light produced by the light source and the target color point on the black-body curve 200, which is known as the degree of departure from the target color point on the black-body curve.

An LED is typically binned after a production run based on a variety of characteristics derived from their spectral power distribution. The cost of the LEDs is determined by the size (distribution) of the bin. For example, a particular LED may be binned based on the value of its peak wavelength. The peak wavelength of an LED is the wavelength where the magnitude of its spectral power distribution is maximal. Peak wavelength is a common metric to characterize the color aspect of the spectral power distribution of blue LEDs. Many other metrics are commonly used to bin LEDs based on their spectral power distribution (e.g. dominant wavelength, xy color point, uv color point, etc.). It is common for blue LEDs to be separated for sale into bins with a range of peak wavelength of five nanometers.

As discussed above, LED based illumination module 100 includes a board 104 with a plurality of LEDs 102. The plurality of LEDs 102 populating board 104 are operable to produce light with a particular spectral power distribution. The color aspect of this spectral power distribution may be characterized by its centroid wavelength. A centroid wavelength is the wavelength at which half of the area of the spectral power distribution is based on contributions from wavelengths less than the centroid wavelength and the other half of the area of the spectral power distribution is based on contributions from wavelengths greater than the centroid wavelength. For a plurality of boards, a standard deviation of the centroid wavelength can be calculated. In some production examples a standard deviation of the centroid wavelength of a plurality of boards may be less than 0.1 nm, e.g., where the boards are populated with LEDs carefully selected for their closely matching spectral power distribution or LEDs from a small bin. Of course, costs increase significantly when producing boards with a standard deviation of the centroid wavelength of approximately 0.1 nm or less. In other examples, a standard deviation of the centroid wavelength of a plurality of boards may be less than 0.5 nm. In yet other examples, a standard deviation of the centroid wavelength of a plurality of boards may be less than 2.0 nm.

The LED based illumination module 100 can accommodate LEDs with a wide spectral power distribution while still achieving a target color point within a predetermined tolerance. Moreover, multiple LED modules 100 may be produced, each with one or more LEDs having different spectral power distributions, e.g., a large standard deviation of the centroid wavelength, while still achieving closely matched color points from one LED based illumination module 100 to the next, and where the matching color points of the LED modules 100 are within a predetermined tolerance from a target color point. Thus, less expensive LEDs may be used. By using the two or more wavelength converting components of the light mixing cavity 109, the color point of the light emitted by the LED based illumination module 100 may be accurately controlled. For example, during assembly of the LED based illumination module 100, the two or more wavelength converting components may be selected based on their wavelength converting characteristics and the spectral power distribution of the light produced by the LEDs 102 so that the resulting light that is transmitted through the window 108 has a color point that is within a predetermined tolerance of a predetermined target color point. The wavelength converting components of the LED based illumination module 100 may be selected to produce a desired degree of departure of $\Delta u'v'$ between 0.009 and 0.0035 and smaller if desired, such as 0.002.

Figure 16:
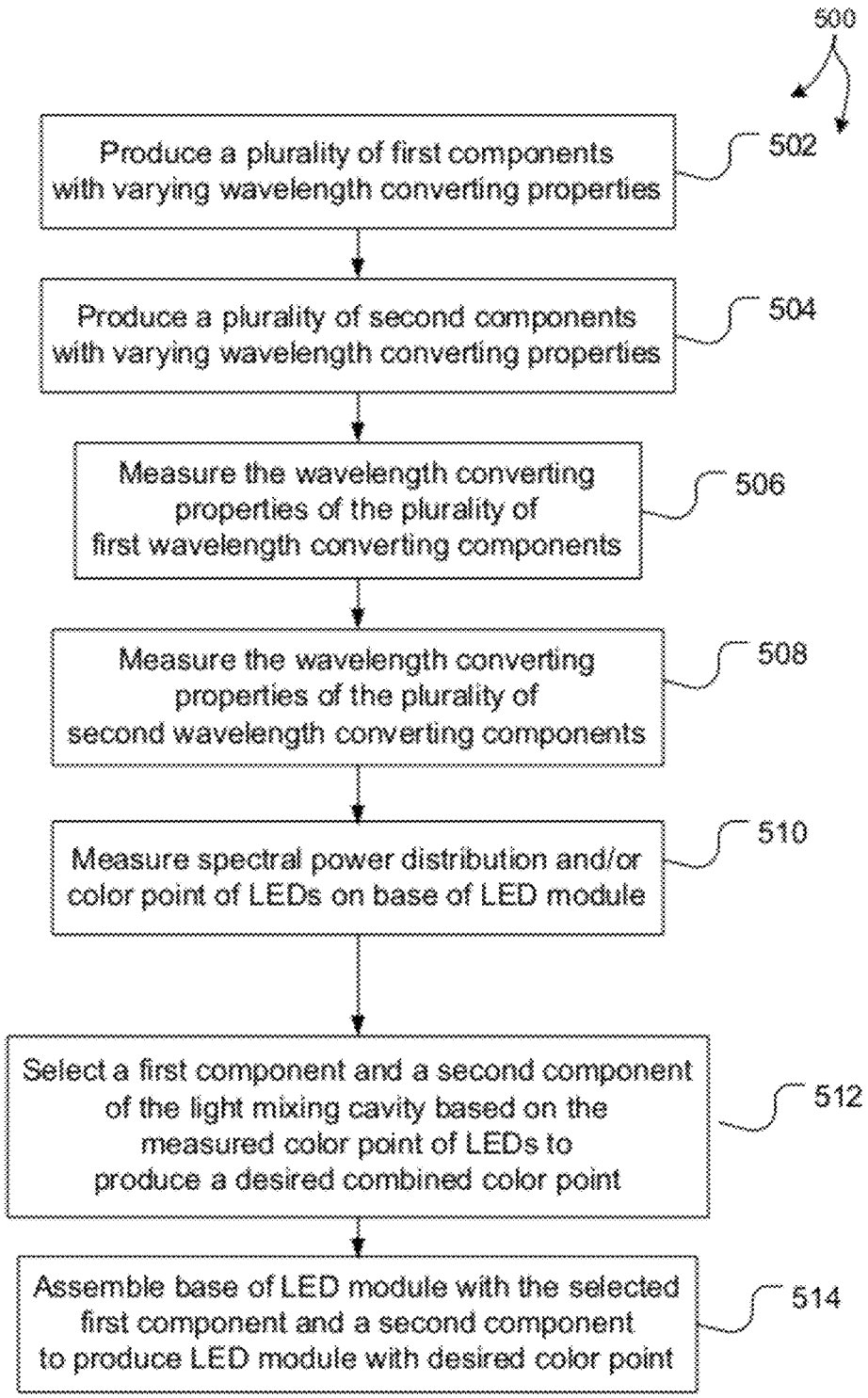
FIG. 16 is a flow chart illustrating a part of the assembly process for an LED based illumination module 100.

FIG. 16 is a flow chart illustrating a part of the assembly process for an LED based illumination module 100. As illustrated in FIG. 16, a plurality of each of the wavelength converting components are produced with varying wavelength converting properties (502 and 504). If desired, the wavelength converting components may be produced by the entity that assembles the LED based illumination module 100 or by an external entity that then provides the wavelength converting components to the entity that assembles the LED based illumination module 100. The different wavelength converting characteristics of the wavelength converting components are produced, e.g., by varying the concentration and/or the thickness of the wavelength converting material on or in the components. The concentration and/or the thickness of the wavelength converting material may be varied to produce components with wavelength converting characteristics that differ by 0.001 $\Delta uv$ (in the CIE 1960 diagram) or less. For example, a plurality of windows 108 may be produced, with different concentrations and/or thicknesses of yellow wavelength converting material. Similarly, a plurality of sidewall inserts 107 (or bottom reflector inserts 106) may be produced, with different concentrations and/or thicknesses of red wavelength converting material. If desired, the same formulation of wavelength converting material may be used for each component, e.g., the sidewall inserts 107 or windows 108, but with differing concentrations and/or thicknesses. Additionally, different formulations of wavelength converting material may be used, e.g., different mixtures of various wavelength converting materials may be used. For example, the sidewall inserts 107 may be coated with a wavelength converting material having differing ratios of red and yellow phosphors with the same or different concentrations and thicknesses. Similarly, different areas of the component may be coated with different wavelength converting materials. Further, the same concentration and thickness may be used, but with differing amounts of coverage area on the component, e.g., the amount of uncovered portion of the sidewall insert may vary.

The wavelength converting characteristics of the plurality of the wavelength converting components are measured (506 and 508). The wavelength converting components are placed on a test fixture, which includes a light source, e.g., a board 104 with LEDs 102, that produces light with a known spectral power distribution and color point. The wavelength converting components are separately placed on the test fixture and the color point shift is measured using, e.g., a spectrometer and an integrating sphere. If desired, an intensity measurement using a dichroic filter can be done as well as or instead of the integrating sphere measurement, or a colorimeter such as produced by Konica-Minolta (CL-200 colorimeter) can be used. The measured wavelength converting characteristics for each component is stored. A self referencing measurement may be used for the wavelength converting characteristics of the components. For example, color point produced by the full spectral power distribution of the LEDs 102 and the measured component may be compared to the color point produced by the spectral power distribution that excludes the wavelength converted light to produce a self referencing $\Delta uv$ value.

The color point shift of the wavelength converting components is illustrated in the CIE 1931 chromaticity diagram of FIG. 5. The color point of the test light source, which produces blue light at, e.g., 445 nm, is illustrated as point 210 in the diagram. The color point produced by, e.g., the wavelength converting material on or within the sidewall insert 107 is illustrated as point 220, which corresponds with a dominant wavelength of, e.g., 630 nm. The color point shift produced by the sidewall insert 107 with the test light source is along the dotted line 222, where the amount of the shift will depend on the geometry of the light mixing cavity 109 and the thickness and/or concentration of the wavelength converting material on the sidewall insert 107. By way of example, the measured color point produced by one of the sidewall inserts 107 with the test light source is illustrated by point 224 and the shift $\Delta xy$ from the color point produced by the test light source without the sidewall insert 107 (e.g., point 210) is illustrated by line 226.

The color point produced by, e.g., the wavelength converting material on or within the window 108, is illustrated as point 230 which corresponds with a dominant wavelength of, e.g., 570 nm. The color point shift produced by a window 108 with the test light source is along the dotted line 232 depending on the thickness and/or concentration of the wavelength converting material on the window 108. By way of example, the measured color point produced by one of the windows 108 with the test light source is illustrated by point 234 and the shift $\Delta xy$ from the color point produced by the test light source without the window 108 (e.g., point 210) is illustrated by line 236. If desired, different formulations of the wavelength converting materials on a wavelength converting component may also be used, which would alter the color point produced by the wavelength converting materials (as illustrated by arrow 240), and thus, the slope of the color point shift.

Typically, there is a difference in spectral power distribution from one LED to the next. For example, LEDs that are supposed to produce blue light at 452 nm will typically produce light that may range between 450 nm and 455 nm or more. In another example, LEDs that are supposed to produce blue light may produce light that ranges between 440 nm and 475 nm. In this example, the spectral power distribution from one LED to another may be as much as eight percent. Accordingly, during the assembly process, the spectral power distribution and/or color point of the LEDs 102 may be measured for each LED based illumination module 100 (510 in FIG. 16). The variation in the spectral power distribution of LEDs is one of the reasons why producing LED based light sources with consistent and accurate color points is difficult. However, because the LED based illumination module 100 includes two or more wavelength converting components with wavelength converting characteristics that can be individually selected, appropriate wavelength converting characteristics of the components can be selected for a large variation of spectral power distributions of LEDs 102 to produce a color point that is within a predetermined tolerance, e.g., a $\Delta u'v'$ of less than 0.0035, from a target color point. The target color point may be, e.g., a CCT of 2700K, 3000K, 4000K, or other temperature on the black-body curve, or alternatively, the target color point may be off of the black-body curve.

FIG. 6 is a diagram illustrating color points of LED modules and predetermined target color points on the black-body curve from the CIE 1960 UCS diagram where the horizontal axis represents CCT and the vertical axis represents the degree of departure ($\Delta uv$) from the black-body curve 400. The target color points may be, e.g., 4000K, 3000K and 2700K on the black-body curve 400. Other target CCTs or color points off of the black-body curve 400 may be used if desired. FIG. 6 illustrates a predetermined tolerance for each of the target color points with a rectangle. For example, at the target color point at 4000K the CCT may vary by ±90K, while at 3000K the CCT may vary by ±55K, and at 2700K the CCT may vary by ±50K. These predefined tolerances for CCT are within a two step MacAdam ellipse centered on each respective target color point on the black-body curve. The predetermined tolerance for the departure from the black-body curve $\Delta uv$ for each CCT is ±0.001. In this example, $\Delta uv$ may vary by a distance of 0.001 above the black-body curve 400 (expressed as a positive tolerance value, +0.001) and may vary by a distance of 0.001 below the black-body curve 400 (expressed as a negative tolerance value, −0.001). This predetermined tolerance for $\Delta uv$ is within a one step MacAdam ellipse centered on each respective target color point on the black-body curve. The predetermined tolerances for CCT and $\Delta uv$ illustrated in FIG. 6 is within a two step MacAdam ellipse and also within the tolerance of $\Delta u'v'$ of 0.0035. The color points within the illustrated tolerance from the target color points are so close that the color difference is indistinguishable for most people even when the light sources are viewed side by side.

The diagram illustrates two color lines centered on the 3000K CCT for reference purposes. One color line 402 corresponds to the color point shift produced by a first wavelength converting material. In the present example, color line 402 is a yellow phosphor coating on the window 108. Color line 404 corresponds to the color point shift produced by a second wavelength converting material. In the present example, color line 404 is a red phosphor coating on the sidewall insert 107. Color line 402 indicates the direction of a shift in color point of light produced by the yellow phosphor. Color line 404 indicates the direction of shift in color point produced by the red phosphor. The first wavelength converting material and the second wavelength converting material are selected such that their respective directions of shift in color point are not parallel. Because the direction of shift of the yellow phosphor and the red phosphor are not parallel, the direction of the color point shift of light emitted by LED based illumination module 100 can be arbitrarily designated. This may be achieved by selecting the proper thickness and/or concentration of each phosphor as discussed above. By way of example, the small spots, 412, 414, 416, and 418 graphically illustrate the color points produced by one LED based illumination module 100 using different wavelength converting components. For example, spot 412 illustrates the color point for the LED based illumination module 100 with one set of wavelength converting components. By selecting a different window 108, the color point shifted for the LED based illumination module 100 to spot 414. As can be seen, the difference in the color points from spot 412 to 414 is parallel with the color line 402. A different sidewall insert 107 is then selected to produce a color point illustrated by spot 416. The difference in the color points from spot 414 to 416 is parallel with the color line 404. While this is within the 3000K target, an attempt to improve the color point by replacing the window 108 resulted in a color point illustrated by spot 418, where the shift between spot 416 and 418 is parallel with the color line 402. By again replacing the window 108 a color point of the LED based illumination module 100 shifted along line 402 to produce a color point illustrated by large spot 420, which is well within the predetermined tolerance from the target color point of 3,000K on the black-body curve.

Figure 7:
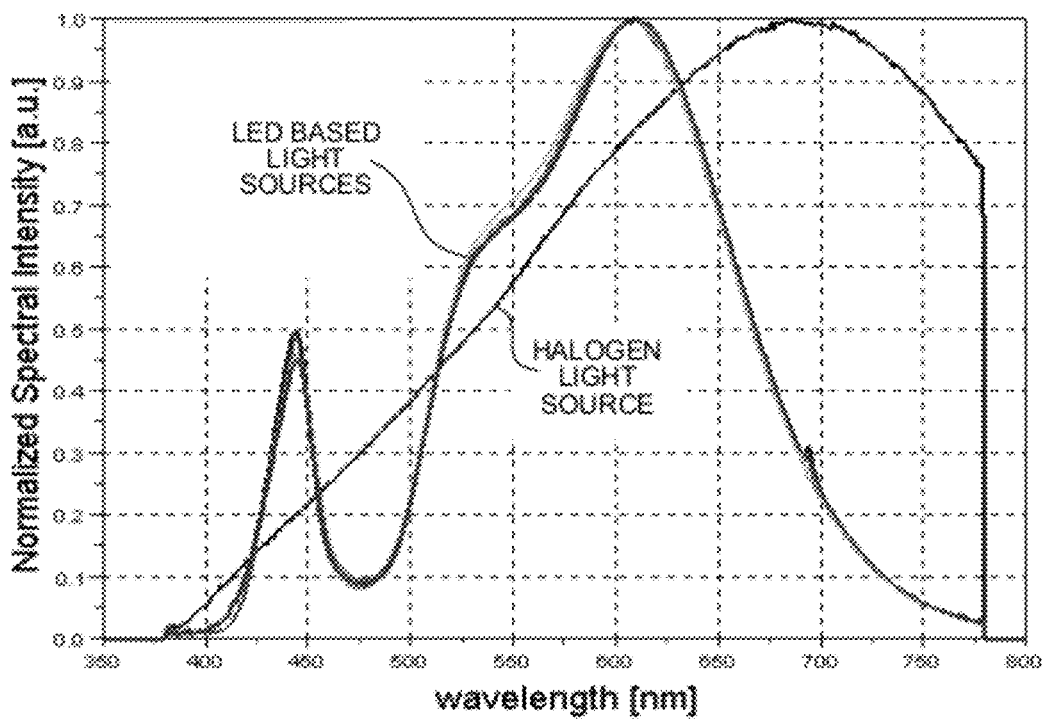
FIG. 7 illustrates the spectrum of a halogen light source and a set of six LED modules, each targeting 3,000 Kelvin.
Figure 8:
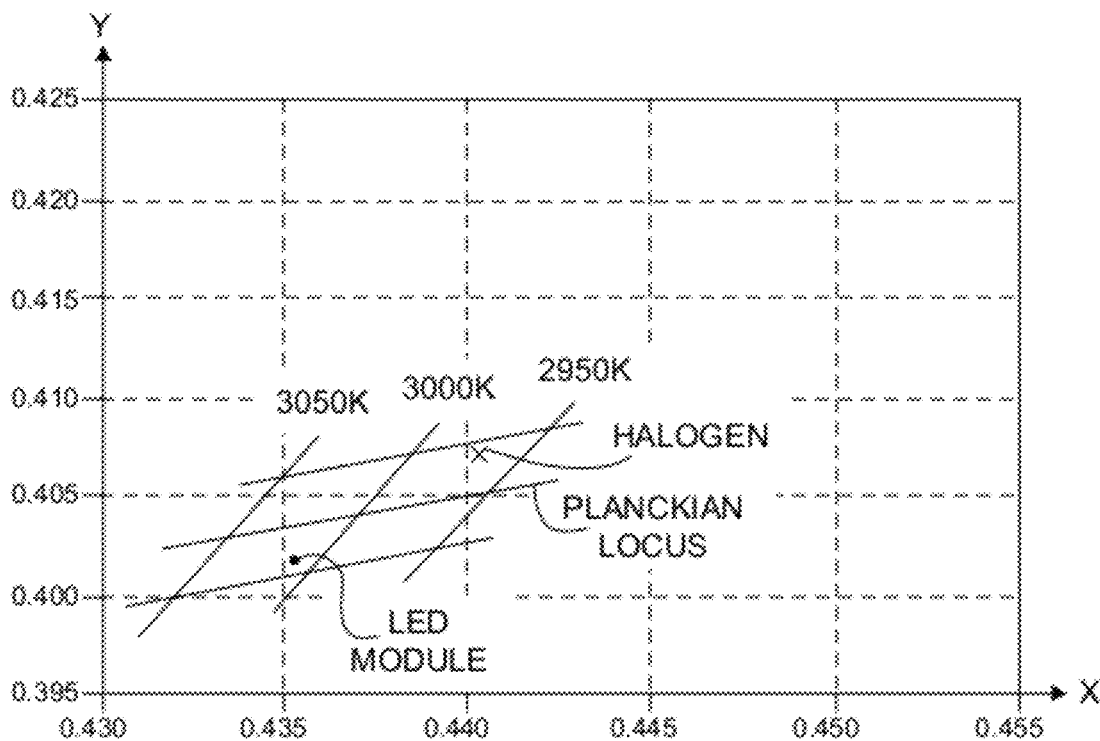
FIG. 8 illustrates the measured xy chromaticity coordinates of a halogen lamp and an LED based illumination module.

In addition to accurate color targeting within a given color space as discussed above, the color space in which color targeting is performed is critical to minimize visually perceptible color differences between light sources of different technologies. For example, FIG. 7 illustrates the spectrum of a halogen light source at 3,000K and a set of six LED modules, each targeting 3,000K. Although both light sources are closely matched instrumentally in CIE 1931 color space, they are not closely matched visually. FIG. 8 illustrates the measured color point of the halogen lamp and an LED based illumination module. Both light sources are within a color target window bounded by isothermal lines of temperature 3000K+/−50K and lines of maximum Δuv of 0.001. If both light sources were LED based illumination modules, these two modules would not be distinguishable visually. Furthermore, if both light sources were halogen lamps, they would not be distinguishable visually. However, the color matching functions associated with the CIE 1931 color space do not accurately express the chromaticity of light sources with widely varying spectra. As illustrated in FIG. 7, the spectrum of a halogen lamp and the spectrum of an LED based illumination module are very different. A halogen lamp exhibits a broadband spectral response, whereas the LED based illumination module exhibits a series of peaks in the red, yellow, and blue wavelength ranges. Due to the deficiencies of the CIE 1931 XYZ color space, LED based light sources that are instrumentally matched to light sources not based on LEDs tend not to match visually. This indicates a failure of the CIE 1931 XYZ color space to accurately express the perceived color of light emitted from light sources with widely differing emission spectra. Furthermore, this creates problems for the reliable manufacture of LED based light sources that generate light perceived to be color matched to light sources that are not based on solid state technology such as LEDs (e.g. halogen, mercury arc, xenon arc, metal halide, high intensity discharge, and incandescent lamps). A visually matched color space is employed to both instrumentally and visually match an LED based light source with a light source not based on LEDs. In a visually matched color space, a light emitted from an LED based illumination module at a target color point visually matches a target light not based on solid state technology at the same target color point. In this manner, an LED based light source and a target light not based on solid state technology may be both visually and instrumentally matched.

Figure 9:
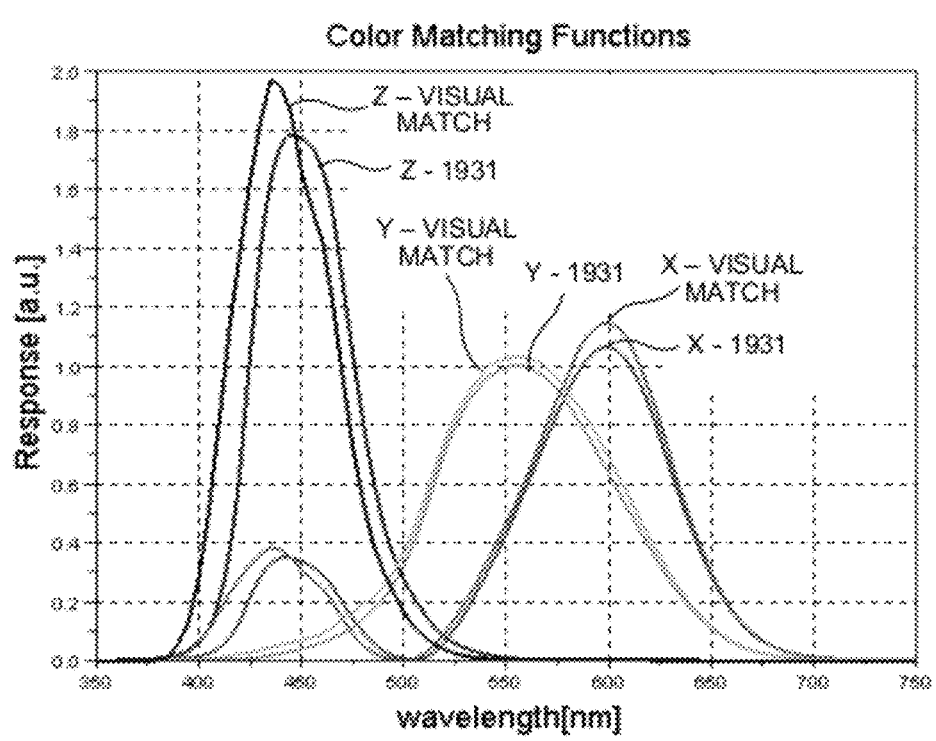
FIG. 9 illustrates the color matching functions associated with each tristimulus value in CIE 1931 XYZ color space and in a halogen matched color space.

FIG. 9 illustrates the color matching functions associated with each tristimulus value in CIE 1931 XYZ color space. In addition, by way of example, color matching functions associated with a visually matched color space designed to both visually and instrumentally match a halogen lamp to an LED based light source are also illustrated. In one example, the color matching functions (CMF$'_x$, CMF$'_y$, and CMF$'_z$) associated with a halogen matched color space are more fully described in a paper presented at the Budapest Midterm meeting of the CIE in May 2009 entitled, "A Better Description of Metameric Experience of LED Clusters" by Peter Csuti and Janos Schanda, which is incorporated herein by reference. LED based illumination modules may be tuned to visually match halogen light sources by instrumentally matching LED based illumination modules to halogen light sources in the halogen matched color space. In an analogous manner, color matching functions may be generated to both visually and instrumentally match an LED based illumination module to a halogen light source or any another light source not based on solid state technology.

The halogen matched color space is based on three color matching functions (CMF$'_x$, CMF$'_y$, and CMF$'_z$). The three tristimulus values (X', Y', and Z') express the halogen matched color space as a three dimensional color space. Each color matching function relates a given spectrum, S(λ), to each of the three tristimulus values, X', Y', and Z', as described in equation (3).

$$X' = \int CMF'_x S(\lambda) d\lambda$$

$$Y' = \int CMF'_y S(\lambda) d\lambda$$

$$Z' = \int CMF'_z S(\lambda) d\lambda \quad (3)$$

Chromaticity of the halogen matched color space may be expressed as a projection of the three dimensional halogen matched color space onto a two dimensional space (x'y') such that brightness is ignored. Each color coordinate (x', y') may be expressed as a function of the three tristimulus values as described in equation (4).

$$x' = \frac{X'}{X' + Y' + Z'} \quad (4)$$

$$y' = \frac{Y'}{X' + Y' + Z'}$$

Figure 10:
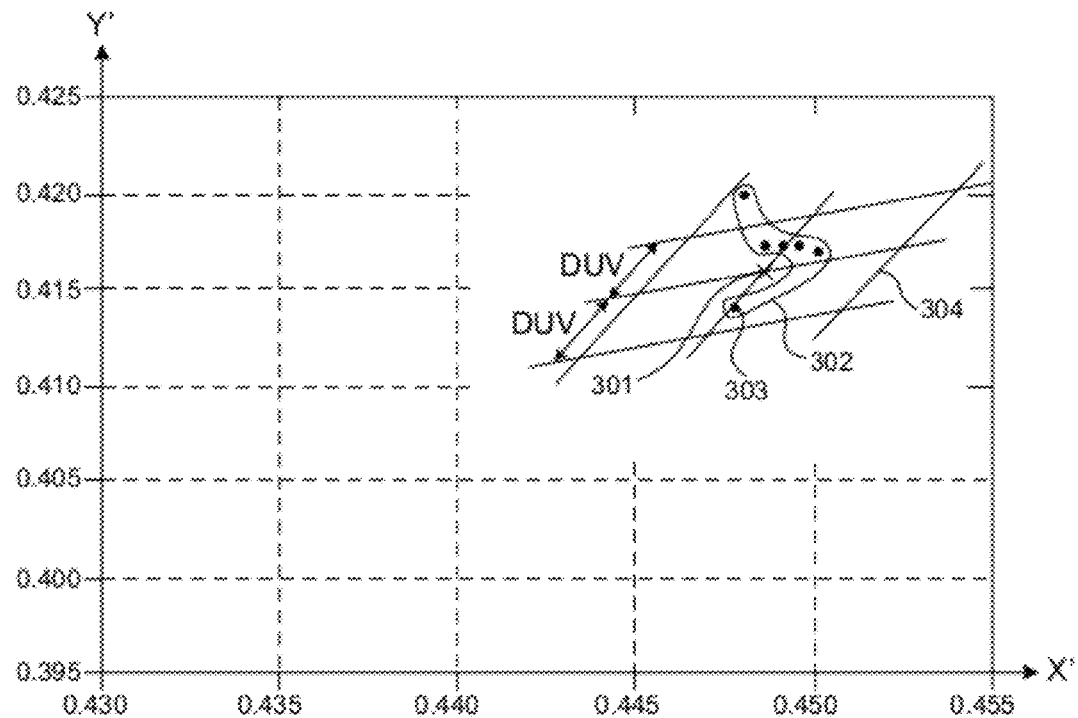
FIG. 10 illustrates the color points of the halogen light source and the group of six LED based illumination modules of FIG. 7 in the halogen matched color space.

FIG. 10 illustrates the color points of the halogen light source 301 and a group 302 of the six LED based illumination modules of FIG. 7 evaluated in a halogen matched color space. Each of the LED based light sources in group 302 visually matches the halogen light source 301. There are many experimental methods to determine a visual match. In one example, a group of color normal individuals examines the halogen light source and the LED based light source and determines if there is any difference in the light color between the two sources. Two light sources are determined to be visually matched by the group when individual observations of relative color begin to disagree with each other. At the point where there is no general agreement concerning relative color differences between the two sources among each of the individuals, a visual match has been achieved. Because each individual perceives color differently, general disagreement among individuals indicates that the color difference between two sources is negligible and the perceived differences are dominated by the differing perceptual sensitivities of each individual rather than the two light sources under comparison. In another example, light sources are considered visually matched when the difference in color is less than a just noticeable difference in color that may be established by experiment.

FIG. 10 also illustrates a color target 304 in the visually matched color space. As discussed above, each LED module of a group of LED modules may be tuned to achieve a color point within the color target 304. Color target 304 may be constructed in any number of ways. For example, color target 304 may be a circle in the halogen matched color space centered on the color point of the halogen light source 301. In some examples, color target 304 may be a circle with a diameter characterized by a degree of departure, Δx'y', between 0.001 and 0.004. In one example, the diameter is a degree of departure, Δx'y', of 0.002. As depicted, color target 304 is bounded by lines of constant CCT and by lines of constant departure from the Planckian locus. In the illustrated example, color target 304 is bounded on one side by a line of 50K less than the CCT of halogen light source 301, on a second side by a line of 50K greater than the CCT of halogen light source 301, on a third side by a line of degree of departure, Δuv, of 0.001 above the degree of departure of the halogen light source, and on a fourth side by a line of degree of departure, Δuv, of 0.001 below the degree of departure of the halogen light source 301. As depicted, color target 304 is centered on the measured color point of halogen light source 301. However, color target 304 may be centered about any other desired color point in a halogen matched color space. For example, color target 304 may be constructed about an average color point of a number of halogen light sources. Five of the six LED based illumination modules are within the color target 304 and are instrumentally matched to the halogen light source centered within the color target 304.

Figure 11:
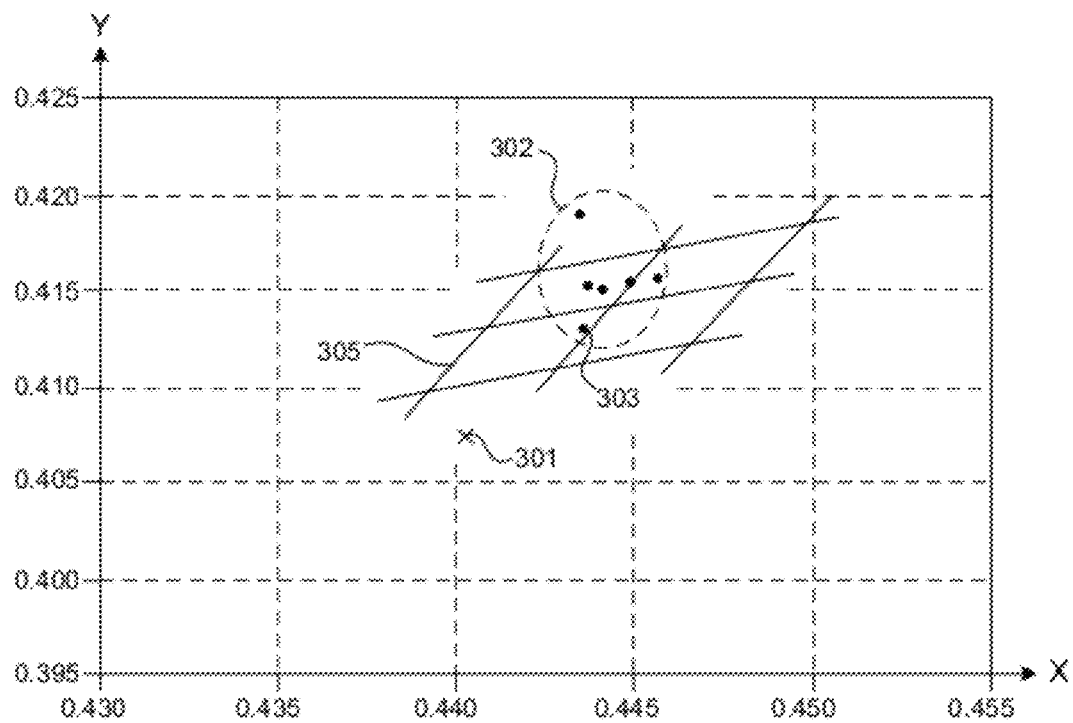
FIG. 11 illustrates the color points of the halogen light source and the group of six LED based illumination modules of FIG. 7 in CIE 1931 color space.

FIG. 11 illustrates a plot of the color points of the halogen light source 301 and the group 302 of six LED based illumination modules of FIG. 7 evaluated in CIE 1931 color space. Because of the differences between CIE 1931 color space and the halogen matched color space, the color point of the halogen light source 301 is not instrumentally matched with the color points of the group 302 of LED based illumination modules. However, each of the LED based illumination modules in group 302 visually matches halogen light source 301. Thus, to both instrumentally and visually match an LED based illumination module with a halogen light source, their respective color points are measured in a halogen matched color space derived from different color matching functions than the CIE 1931 color space.

FIG. 11 also illustrates the color point 303 of one of the group of LED based illumination modules in CIE 1931 color space. The color point 303 may be calculated based on the CIE 1931 color matching functions and the spectrum of the underlying LED based illumination module as illustrated in the aforementioned equations (1) and (2). Because the LED based illumination module visually matches the halogen light source, the color point of this module expressed in CIE 1931 color space may be used as the basis to construct a color target 305 in CIE 1931 color space. Color target 305 may be constructed in any number of ways. For example, color target 305 may be a circle in CIE 1931 color space centered on the color point 303 of the LED based illumination module. In another example, color target 305 may be a polygon bounded by lines of fixed degree of departure from the Planckian locus and lines of constant CCT. In another example, color target 305 may be centered on an average color point of a number of LED based modules that are visually matched to a halogen light source.

As discussed above with respect to FIG. 10, a color target for LED based illumination modules may be constructed about the color point of an arbitrary light source in a visually matched color space. In addition, as discussed above with respect to FIG. 11, a color target may be constructed in CIE 1931 color space about a measured LED based light source that is visually matched to an arbitrary light source. In addition, a color target may also be constructed about a reference illuminant in a visually matched color space. Also, a color target may be constructed in CIE 1931 color space about a measured LED based light source that is visually matched to a light source that emulates a reference illuminant.

Figure 12:
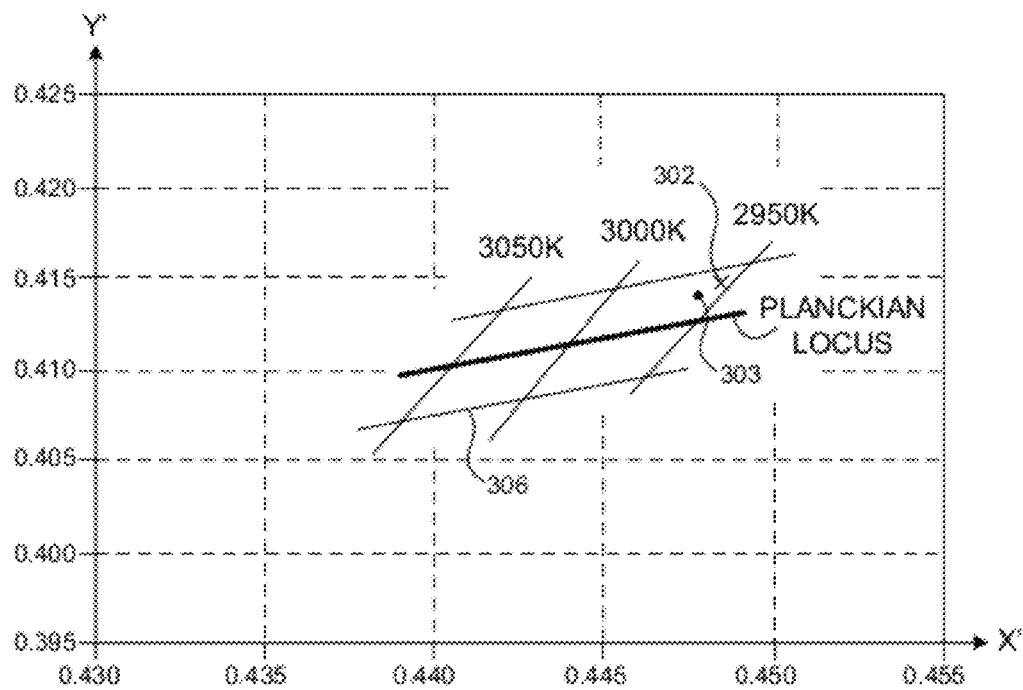
FIG. 12 illustrates the Planckian locus and a color target based on the Planckian locus plotted in the halogen matched color space.

FIG. 12 illustrates the Planckian locus plotted in the halogen matched color space. A color target 306 based on a color target on the Planckian locus may be constructed in the halogen matched color space. In one example, a color target may be based on a polygon bounded by lines of fixed degree of departure from the Planckian locus and lines of constant CCT. In the illustrated example, color target 306 is bounded on one side by a line of 2950K, on a second side by a line of 3050K, on a third side by a line of degree of departure of 0.001 above the Planckian locus, and on a fourth side by a line of degree of departure of 0.001 below the Planckian locus. FIG. 12 illustrates that both the color point 303 of an LED based illumination module and the color point 303 of a halogen light source are within the predefined color target 306. Both color points 303 and 303 are instrumentally matched in the halogen matched color space and the respective light sources visually match.

Figure 13:
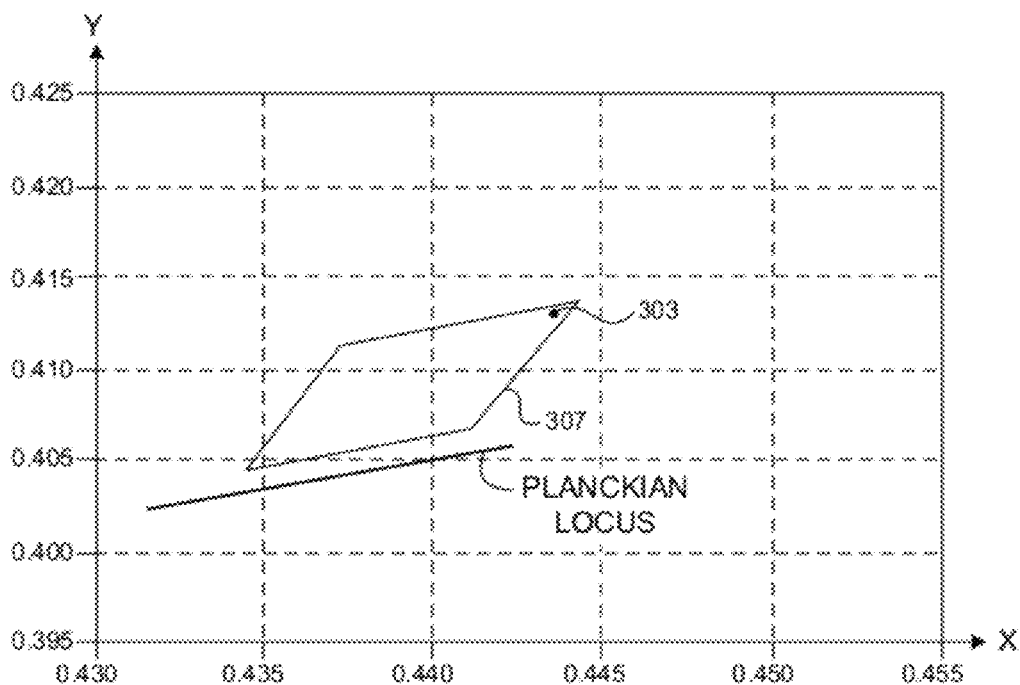
FIG. 13 illustrates a color target in CIE 1931 color space.

FIG. 13 illustrates a color target 307 in CIE 1931 color space. LED based illumination modules constructed within color target 307 visually match halogen light sources that emulate a blackbody radiator near 3,000K. The color point 303 in CIE 1931 color space may be calculated based on the known spectrum of color point 303 in accordance with the aforementioned equations (1) and (2). Color target 307 may be constructed in many different ways. In one example, a color target 307 may be defined in the same manner as color target 306 and centered about color point 303 in CIE 1931 color space. In another example, color target 307 may be centered about an average color point of a number of LED based illumination modules that are visually matched to a halogen light source that emulates a blackbody radiator near 3,000K. Because the CIE 1931 color space does not both visually and instrumentally match halogen light sources and LED based light sources, constructing LED modules along the Planckian locus in CIE 1931 color space will not result in light sources that visually match a halogen source constructed within the same color target.

Figure 14:
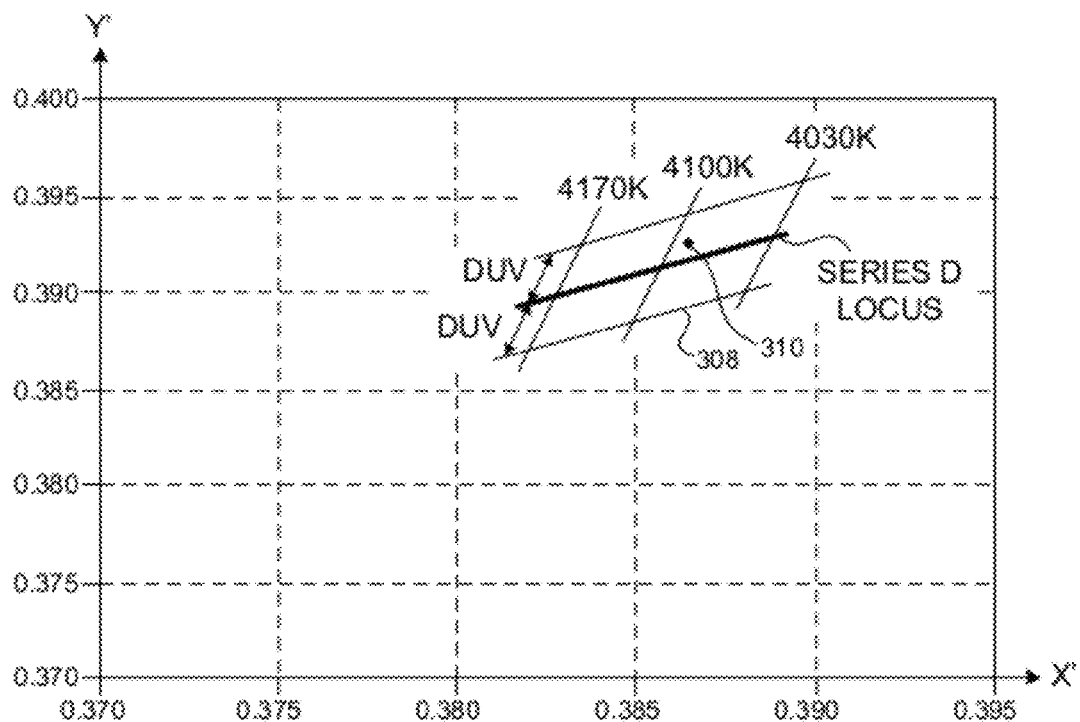
FIG. 14 illustrates the locus of CIE illuminant series D and a color target plotted in the halogen matched color space.

FIG. 14 illustrates the locus of CIE illuminant series D plotted in the halogen matched color space. A color target 308 based on the Series D locus may be constructed in the halogen matched color space. In one example, a color target may be based on a polygon bounded by lines of fixed degree of departure from the Planckian locus and lines of constant CCT. In the illustrated example, color target 308 is bounded on one side by a line of 4030K, on a second side by a line of 4170K, on a third side by a line of degree of departure of 0.001 above the Series D locus, and on a fourth side by a line of degree of departure of 0.001 below the Series D locus. Color point 310 is the measured color point of an LED based illumination module that visually matches a halogen light source designed to emulate a Series D illuminant near 4,100 Kelvin. In this example, the halogen light source is constructed by EiKO Ltd. In another example, an LED based illumination module could be constructed to visually match daylight directly.

Figure 15:
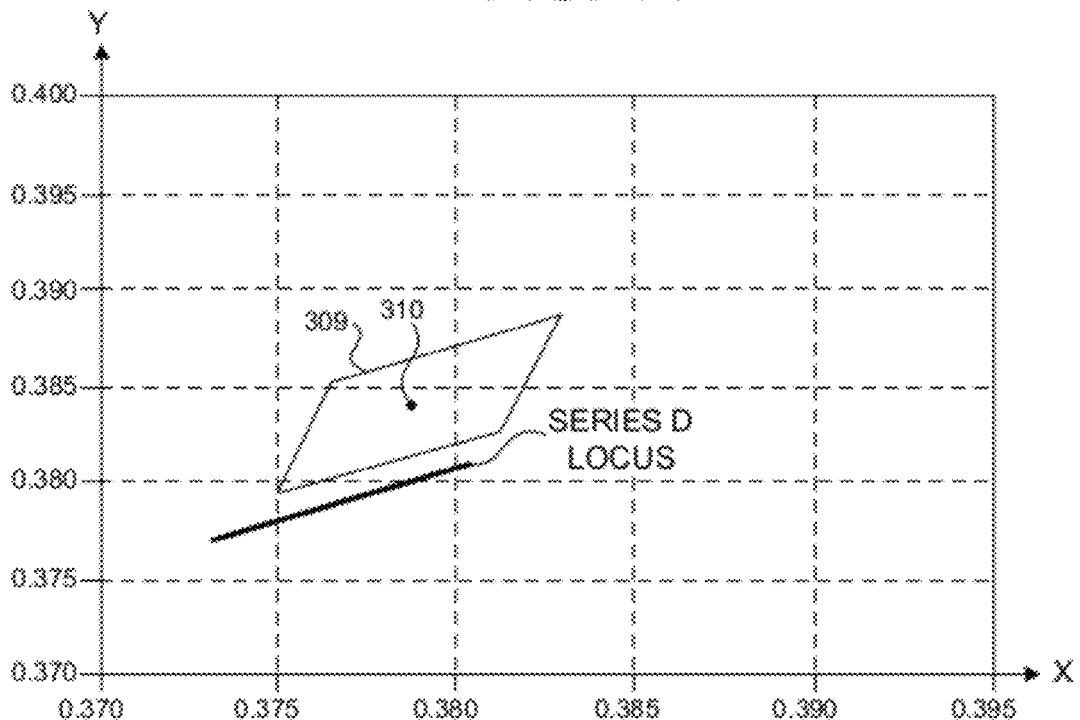
FIG. 15 illustrates a color target 309 in CIE 1931 color space.

FIG. 15 illustrates a color target 309 in CIE 1931 color space. LED based illumination modules constructed within color target 309 visually match a non-LED based light source that emulates a Series D illuminant near 4,100K. The color point 310 of the visually matched LED based illumination module is illustrated in the halogen matched color space in FIG. 14 and is illustrated in CIE 1931 color space in FIG. 15. Color point 310 in CIE 1931 color space may be calculated based on the known spectrum of the LED based illumination module in accordance with the aforementioned equations (1) and (2). Color target 309 may be constructed in many different ways. In one example, a color target 309 may be defined in the same manner as color target 308 and centered about color point 310 in CIE 1931 color space. In another example, color target 309 may be centered about an average color point of a number of LED based illumination modules that are visually matched to a light source that emulates a Series D illuminant near 4,100K. Because the CIE 1931 color space does not both visually and instrumentally match halogen light sources and LED based light sources, constructing LED modules along the locus of Series D illuminants in CIE 1931 color space will not result in light sources that visually match a halogen source constructed within the same color target.

Figure 17:
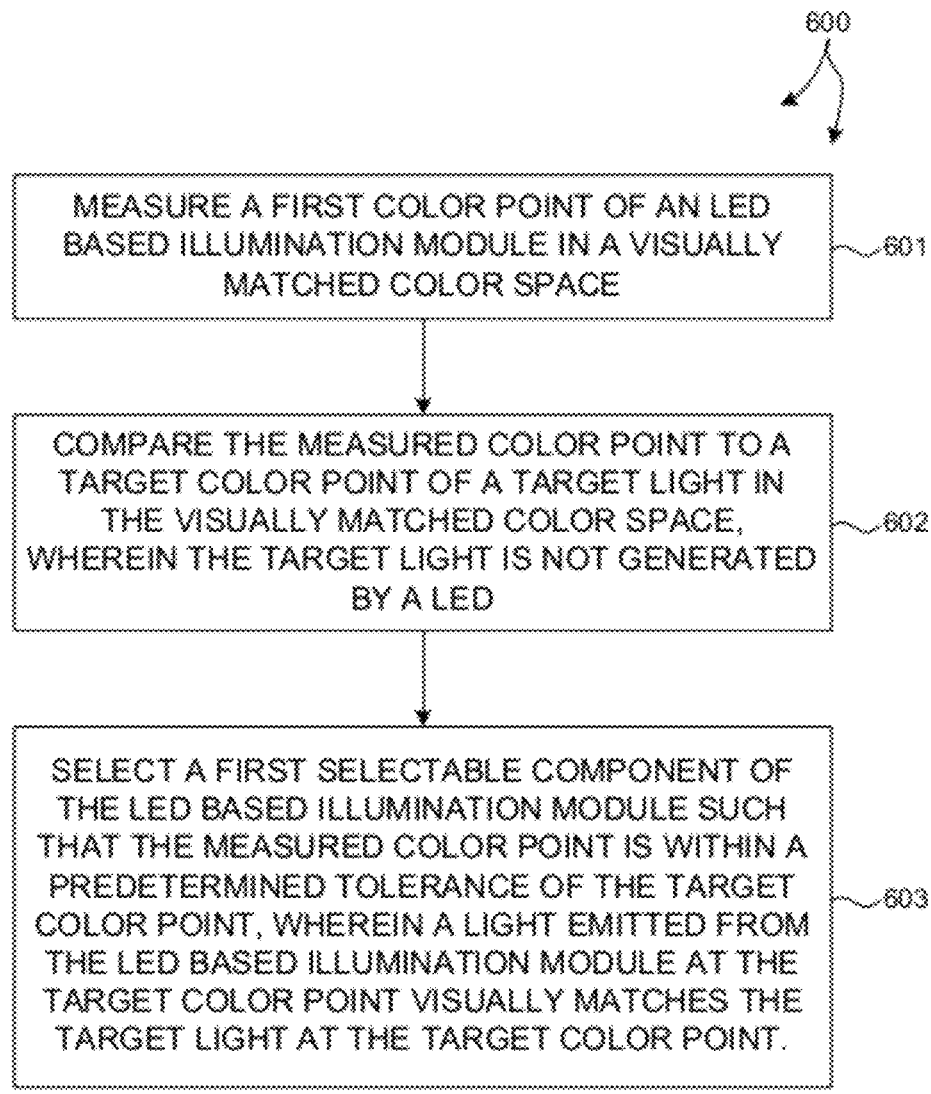
FIG. 17 illustrates a method 600 of tuning an LED based illumination module in a visually matched color space.

FIG. 17 illustrates a method 600 of tuning an LED based illumination module in a visually matched color space. Method 600 involves measuring a first color point of an LED based illumination module in a visually matched color space (e.g. halogen matched color space) (step 601). Method 600 also involves comparing the measured color point to a target color point of a target light in the visually matched color space (step 602). For example, the target light may be a halogen light source and the target color point may be the color point of the halogen light source in the visually matched color space. The target light may be any light source or illuminant that does not include an LED as the illumination source.

Method 600 also involves selecting a first selectable component of the LED based illumination module (step 603). The selection is made such that the measured color point is within a predetermined tolerance of the target color point. Because the color point and the target color point are expressed in a visually matched color space, a light emitted from the LED based illumination module at the target color point visually matches the target light at the same color point.

Figure 18:
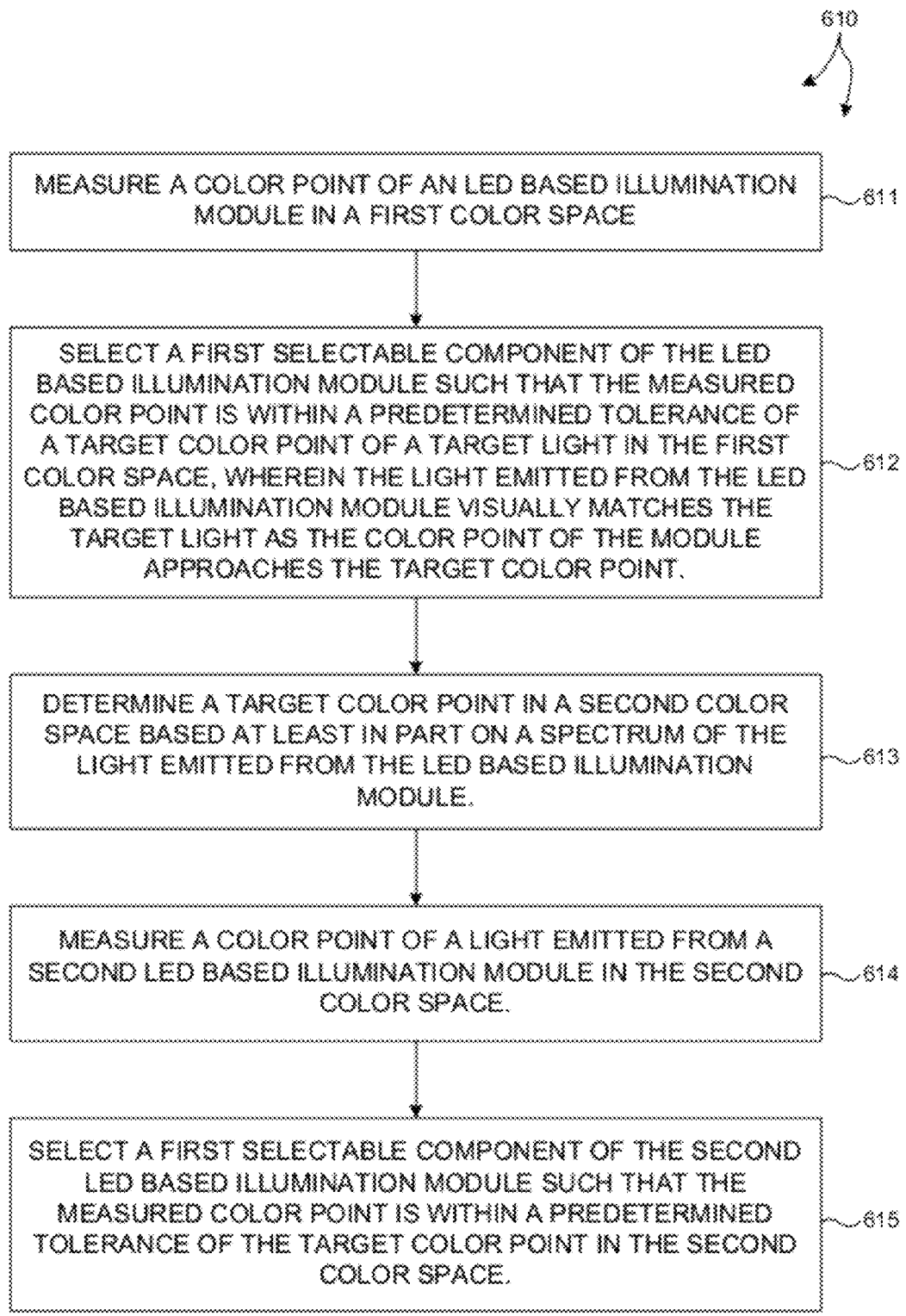
FIG. 18 illustrates a method 610 of tuning an LED based module in a visually matched color space and using the spectrum of a tuned LED based module to determine a target color point in a second color space that is not visually matched.

FIG. 18 illustrates a method 610 of tuning an LED based module in a visually matched color space and using the spectrum of a tuned LED based module to determine a target color point in a second color space that is not visually matched. Method 610 involves measuring a color point of an LED based illumination module in a first color space (e.g. visually matched color space) (step 611). The target light may be any light source or illuminant that does not include an LED as the illumination source. Method 610 also involves selecting a first selectable component of the LED based illumination module (step 612). The selection is made such that the measured color point is within a predetermined tolerance of a target color point of a target light (e.g. halogen light source) in the first color space. Because the color point and the target color point are expressed in a visually matched color space, a light emitted from the LED based illumination module at the target color point visually matches the target light at the same color point. In a next step (step 613), a target color point is determined in a second color space based at least in part on a spectrum of the light emitted from the LED based illumination module. For example, the second color space may be the CIE 1931 color space. Based on the measured spectrum of the LED based illumination module that is visually matched to the target light, the color point of the module in CIE 1931 color space may be calculated using equations (1) and (2). In one example the calculated color point may be treated as a target color point in CIE 1931 color space. By way of example, the CIE 1931 color space is not visually matched to halogen light sources, thus the color point of a halogen light source expressed in CIE 1931 color space will be different from the color point of the visually matched LED based illumination module. As a result, the color point of the halogen light source expressed in CIE 1931 color space is not a suitable target color point to produce visually matched LED based illumination modules. In a next step (step 614), the color point of a second LED based illumination module is measured in the second color space. In a next step (step 615), a first selectable component of the second LED based illumination module is selected such that the measured color point is within a predetermined tolerance of the target color point in the second color space. In this manner, LED based illumination modules may be color tuned in CIE 1931 color space such that the resulting modules visually match a light that is not based on LEDs. Tuning in CIE 1931 color space may be desirable because a significant amount of color measurement equipment useful in the production of LED based illumination modules is programmed with the color matching functions of the CIE 1931 color space.

Figure 19:
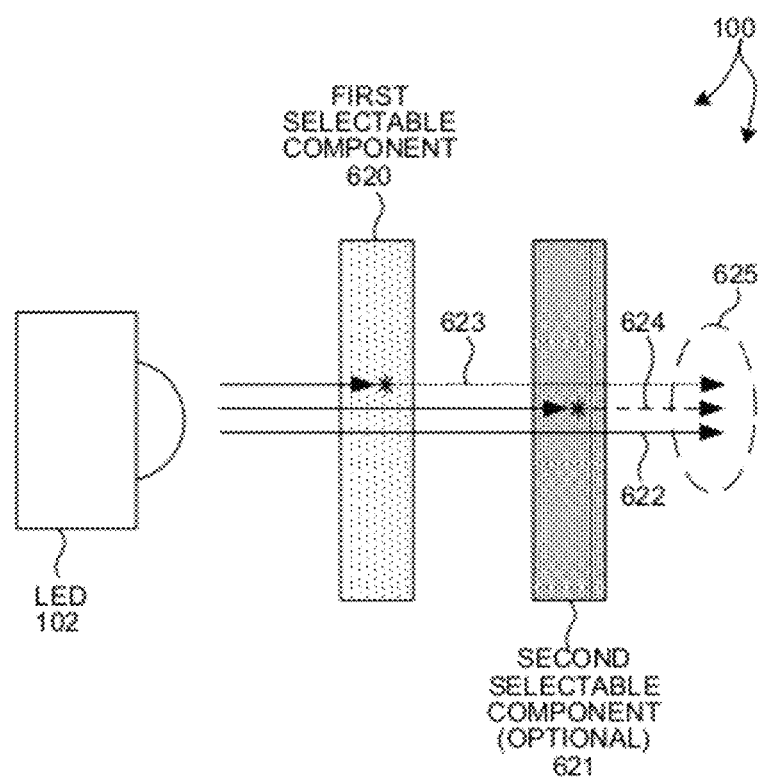
FIG. 19 illustrates a LED based illumination module with at least one selectable component to perform color tuning.

Although certain specific embodiments are described above for instructional purposes, the teachings of this patent document have general applicability and are not limited to the specific embodiments described above. In one example, a halogen matched color space is introduced and tuning of an LED based illumination module to visually match a halogen light source is described. However, in other embodiments, any color matched color space may be utilized that is suitable to visually match an LED based illumination module with an arbitrary light source that does not include LEDs. In another example, a LED based illumination module with selectable components to perform color tuning is discussed. In another example, FIG. 19 illustrates an LED based illumination module 100 that includes an LED 102 and a first selectable component 620. A second selectable component 621 may also be optionally included. LED based illumination module 100 generates a combined light 625 that is visually and instrumentally matched to a light that is not based on solid state technology. A first portion of light 622 emitted from LED 102 may contribute to combined light 625 without conversion by either the first or second selectable component. A second portion 623 of light emitted from LED 102 is converted in color by first selectable component 620 and contributes to combined light 625. Optionally, a third portion 624 of light emitted from LED 102 is converted in color by second selectable component 621 and contributes to combined light 625. In other embodiments, LED based illumination modules with general color tuning capability (e.g. electronic color tuning, tuning by mechanical adjustment, and tuning by varying chemical composition and/or concentration) may be employed either prior to or after final assembly to achieve a visual color matching to an arbitrary light source that does not include LEDs. In another example, the color tuning of LED based illumination modules in CIE 1931 color space targeting a color target based at least in part on the spectrum of a LED based illumination module that is visually matched to a light not based on solid state technology is discussed. However, in other embodiments, LED based illumination modules may be color tuned in other color spaces (e.g. a color space based on any of the CIE 1931 standard colorimetric observer and the CIE 1964 supplementary standard colorimetric observer) based at least in part on the spectrum of a LED based illumination module that is visually matched to a light not based on solid state technology.

Accordingly, various modifications, adaptations, and combinations of various features of the described embodiments can be practiced without departing from the scope of the invention as set forth in the claims.

What is claimed is:

1. A method comprising:
    measuring a first color point of a light emitting diode (LED) based illumination module in a visually matched color space, wherein a visually matched color space is a space in which light emitted from an LED based illumination module at a target color point visually matches a target light that is not based on solid state technology at the same target color point;
    comparing the measured first color point to the target color point of the target light in the visually matched color space, wherein the target light is not generated by a LED; and
    selecting and installing in the LED based illumination module a first selectable component that includes a first type of wavelength converting material having a first wavelength converting characteristic that converts light produced by at least one light emitting diode of the LED based illumination module to shift the first color point in the visually matched color space to within a predetermined tolerance of the target color point, wherein a light emitted from the LED based illumination module at the target color point visually matches the target light at the target color point.

2. The method of claim 1, wherein the visually matched color space is based on a plurality of color matching functions that differ from a plurality of color matching functions of a CIE 1931 color space.

3. The method of claim 1, wherein the target light is an illuminant taken from a group consisting of: an A series illuminant, a B series illuminant, a C series illuminant, a D series illuminant, an E series illuminant, a F series illuminant, and a blackbody radiator.

4. The method of claim 1, wherein the target light is a light source taken from a group consisting of: a halogen lamp, a compact metal halide lamp, a high intensity discharge lamp, and a fluorescent lamp.

5. The method of claim 1, further comprising:
selecting a second selectable component that includes a second type of wavelength converting material having a second wavelength converting characteristic that converts light produced by at least one light emitting diode of the LED based illumination module to shift the first color point in the visually matched color space to within the specified tolerance of the target color point.

6. The method of claim 5, wherein the first type of wavelength converting material of the first selectable component produces a color point shift along a first direction in the visually matched color space in response to an amount of light produced by at least one light emitting diode of the LED based illumination module and the second type of wavelength converting material of the second selectable component produces a color point shift along a second direction in the visually matched color space in response to the amount of light produced by the at least one light emitting diode, wherein the first direction and the second direction are not parallel.

7. The method of claim 1, wherein the predetermined tolerance is within a degree of departure of 0.0035 from the target color point in the visually matched color space.

8. A method comprising:
measuring a color point of a light emitted from a first light emitting diode (LED) based illumination module in a first color space;
selecting a first selectable component of the first LED based illumination module such that the measured color point is within a predetermined tolerance of a target color point of a target light in the first color space, wherein the light emitted from the LED based illumination module is visually matched to the target light when the color point of the first LED based illumination module is within the predetermined tolerance of the target color point in the first color space; and
determining a target color point in a second color space that corresponds to the measured color point based at least in part on a spectrum of the light emitted from the LED based illumination module.

9. The method of claim 8, further comprising:
measuring a color point of a light emitted from a second LED based illumination module in the second color space; and
selecting a first selectable component of the second LED based illumination module such that the measured color point is within a predetermined tolerance of the target color point in the second color space.

10. The method of claim 8, wherein the target light is not generated by a light emitting diode.

11. The method of claim 8, wherein the second color space is a CIE 1931 color space.

12. The method of claim 8, wherein the target light is taken from a group consisting of: an A series illuminant, a B series illuminant, a C series illuminant, a D series illuminant, an E series illuminant, a F series illuminant, and a blackbody radiator.

13. The method of claim 8, wherein the target light is taken from a group consisting of: a halogen lamp, a compact metal halide lamp, a high intensity discharge lamp, and a fluorescent lamp.

14. The method of claim 8, wherein the first color space is based on a plurality of color matching functions that differ from a plurality of color matching functions of the CIE 1931 color space.

15. The method of claim 8, wherein the light emitted from the first LED based illumination module does not visually match the target light as a color point of the LED based illumination module measured in the second color space approaches a target color point of the target light in the second color space.

16. The method of claim 8, further comprising:
selecting a second selectable component of the first LED based illumination module such that the measured color point is within a predetermined tolerance of the target color point of the target light in the first color space.

17. The method of claim 9, further comprising:
selecting a second selectable component of the second LED based illumination module such that the measured color point is within a predetermined tolerance of the target color point in the second color space.

* * * * *